(12) United States Patent
Tsuzuki et al.

(10) Patent No.: US 10,852,618 B2
(45) Date of Patent: Dec. 1, 2020

(54) OPTICAL MODULATOR HAVING INTERCONNECTING GROUND ELECTRODES FOR COPLANAR WAVEGUIDES

(71) Applicant: NIPPON TELEGRAPH AND TELEPHONE CORPORATION, Tokyo (JP)

(72) Inventors: Ken Tsuzuki, Atsugi (JP); Yuriko Kawamura, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 329 days.

(21) Appl. No.: 16/084,128

(22) PCT Filed: Mar. 14, 2017

(86) PCT No.: PCT/JP2017/010084
§ 371 (c)(1),
(2) Date: Sep. 11, 2018

(87) PCT Pub. No.: WO2017/159651
PCT Pub. Date: Sep. 21, 2017

(65) Prior Publication Data
US 2020/0292908 A1    Sep. 17, 2020

(30) Foreign Application Priority Data

Mar. 18, 2016    (JP) .................................. 2016-055646

(51) Int. Cl.
*G02F 1/225*    (2006.01)
(52) U.S. Cl.
CPC .......... *G02F 1/2255* (2013.01); *G02F 1/2257* (2013.01); *G02F 2201/063* (2013.01)

(58) Field of Classification Search
CPC ...... G02F 1/2255; G02F 1/2257; G02F 1/035; G02F 1/0356; G02F 1/21; G02F 1/025;
(Continued)

(56) References Cited

U.S. PATENT DOCUMENTS 4,288,785 A * 9/1981 Papuchon ................. G02F 7/00
 341/111
5,119,447 A * 6/1992 Trisno ................... G02F 1/3136
 385/3

(Continued)

FOREIGN PATENT DOCUMENTS

EP    2 624 045 A1    8/2013
GB    2 407 644 A    5/2005
(Continued)

OTHER PUBLICATIONS

European Search Report dated Oct. 9, 2019, issued in EP Application No. 17766650.0.
(Continued)

*Primary Examiner* — Andrew Jordan
(74) *Attorney, Agent, or Firm* — Workman Nydegger

(57) ABSTRACT

In a dual electrode Si optical modulator having a CPW electrode structure according to a related art, a phase difference of return currents propagating through two ground electrodes degrades the modulation frequency characteristic. To prevent this degradation, the modulator length has been shortened to terminate signal propagation before occurrence of a phase difference. However, a short modulator length would reduce an electric field applied to the optical waveguide, thus lowering the modulation efficiency. An optical modulator according to the present invention includes a bridge wiring that connects two ground electrodes, disposed between an RF electrode and an optical waveguide inside a substrate. The bridge wiring equalizes the potential between the two ground electrodes of the CPW, thereby eliminating (Continued)

a phase difference of return currents induced by a radio-frequency electrical signal to the RF electrode and propagating through the two ground electrodes. It is thus possible to fabricate a Si optical modulator with suppressed degradation of the radio frequency characteristic.

9 Claims, 15 Drawing Sheets

(58) Field of Classification Search
CPC .............. G02F 1/015; G02F 2201/063; G02F 2201/121
See application file for complete search history.

(56) References Cited

U.S. PATENT DOCUMENTS

| | | | | |
|---|---|---|---|---|
| 5,416,858 A * | 5/1995 | Riviere | G02F 1/3136 | 359/254 |
| 5,652,557 A * | 7/1997 | Ishikawa | H01L 23/66 | 333/238 |
| 6,298,177 B1 * | 10/2001 | House | G02F 1/025 | 385/3 |
| 6,526,186 B2 * | 2/2003 | Burns | G02F 1/2255 | 359/238 |
| 6,584,239 B1 * | 6/2003 | Dawnay | G02F 1/025 | 385/1 |
| 6,801,702 B2 * | 10/2004 | Day | G02F 1/025 | 385/129 |
| 7,082,237 B2 * | 7/2006 | Walker | G02F 1/2257 | 385/1 |
| 7,085,443 B1 * | 8/2006 | Gunn, III | G02F 1/025 | 359/245 |
| 7,136,544 B1 * | 11/2006 | Gunn, III | G02B 6/12004 | 385/3 |
| 7,277,603 B1 * | 10/2007 | Roberts | G02F 1/0121 | 385/1 |
| 7,492,979 B2 * | 2/2009 | Wang | B82Y 20/00 | 356/477 |
| 7,555,174 B2 * | 6/2009 | Kuver | G02F 1/2255 | 385/129 |
| 7,616,843 B2 * | 11/2009 | Ishizaka | G02F 1/0147 | 385/2 |
| 8,238,017 B2 * | 8/2012 | Tu | H04B 10/60 | 359/279 |
| 8,520,985 B2 * | 8/2013 | Park | G02F 1/025 | 385/3 |
| 8,643,929 B2 * | 2/2014 | Gill | G02F 1/025 | 359/259 |
| 9,036,953 B2 * | 5/2015 | Witzens | G02F 1/025 | 385/2 |
| 9,110,348 B2 * | 8/2015 | Goi | G02B 6/122 | |
| 9,223,185 B2 * | 12/2015 | Chen | G02F 1/2257 | |
| 9,423,667 B2 * | 8/2016 | Matsumoto | G02F 1/2257 | |
| 9,448,425 B2 * | 9/2016 | Ogawa | G02F 1/015 | |
| 9,673,052 B2 * | 6/2017 | Shikauchi | C30B 25/18 | |
| 9,709,830 B2 * | 7/2017 | Akiyama | G02F 1/025 | |
| 9,966,259 B2 * | 5/2018 | Shikauchi | H01L 21/0259 | |
| 9,977,266 B2 * | 5/2018 | Sugamata | G02F 1/0327 | |
| 10,241,354 B1 * | 3/2019 | Gill | G02F 1/01708 | |
| 10,267,995 B2 * | 4/2019 | Sakamoto | G02B 6/10 | |
| 10,310,299 B2 * | 6/2019 | Sugamata | G02F 1/2257 | |
| 10,481,464 B2 * | 11/2019 | Kataoka | G02F 1/2257 | |
| 10,488,732 B2 * | 11/2019 | Srinivasan | H01L 31/105 | |
| 10,663,770 B2 * | 5/2020 | Dupuis | H04B 10/5059 | |
| 2002/0195622 A1 * | 12/2002 | Ishimura | B82Y 20/00 | 257/200 |
| 2003/0118267 A1 * | 6/2003 | Kimber | G02F 1/0344 | 385/14 |
| 2004/0016920 A1 * | 1/2004 | Akiyama | H01S 5/0265 | 257/14 |
| 2004/0026738 A1 * | 2/2004 | Hasegawa | H01L 28/20 | 257/347 |
| 2004/0052491 A1 * | 3/2004 | Otake | G02F 1/2257 | 385/131 |
| 2006/0008223 A1 * | 1/2006 | Gunn, III | G02F 1/025 | 385/129 |
| 2006/0035421 A1 * | 2/2006 | Hasegawa | H01L 28/20 | 438/155 |
| 2006/0120655 A1 * | 6/2006 | Walker | G02F 1/0123 | 385/9 |
| 2006/0159383 A1 * | 7/2006 | Jones | G02F 1/025 | 385/1 |
| 2006/0273395 A1 * | 12/2006 | Tanaka | H01L 27/1203 | 257/350 |
| 2007/0242915 A1 | 10/2007 | Kuver et al. | | |
| 2009/0290206 A1 | 11/2009 | Sugiyama | | |
| 2010/0060970 A1 * | 3/2010 | Chen | G02F 1/025 | 359/245 |
| 2010/0156679 A1 * | 6/2010 | Ehrlichman | H04B 10/25891 | 341/50 |
| 2011/0044573 A1 * | 2/2011 | Webster | G02F 1/0121 | 385/3 |
| 2011/0235971 A1 * | 9/2011 | Hashimoto | B82Y 20/00 | 385/31 |
| 2012/0189239 A1 * | 7/2012 | Tu | G02F 1/025 | 385/2 |
| 2012/0230626 A1 * | 9/2012 | Metz | H04B 10/5051 | 385/3 |
| 2012/0251032 A1 * | 10/2012 | Kato | H04B 10/556 | 385/3 |
| 2013/0170782 A1 * | 7/2013 | Evans | G02F 1/2257 | 385/3 |
| 2014/0199014 A1 * | 7/2014 | Velthaus | G02F 1/2255 | 385/3 |
| 2014/0233878 A1 | 8/2014 | Goi et al. | | |
| 2014/0233962 A1 * | 8/2014 | Kato | G02F 1/225 | 398/183 |
| 2015/0043866 A1 | 2/2015 | Chen et al. | | |
| 2015/0277158 A1 | 10/2015 | Akiyama | | |
| 2015/0378238 A1 | 12/2015 | Matsumoto | | |
| 2020/0292908 A1 * | 9/2020 | Tsuzuki | G02F 1/035 | |

FOREIGN PATENT DOCUMENTS

| | | |
|---|---|---|
| JP | 2007-510180 A | 4/2007 |
| JP | 2016-14697 A | 1/2016 |
| WO | 2015/151978 A1 | 10/2015 |

OTHER PUBLICATIONS

Kazuhiro Goi et al., *20Gbps Binary Phase Shift Keying Using Silicon Mach-Zehnder Push-Pull Modulator*, The Institute of Electronics, Information, and Communications Engineers, Electronics Society Conference in 2012, C-3-50, pp. 2.

Noriharu Suematsu, IEICE, Forest of Knowledge, *Monolithic Microwave Integrated Circuit*, Series 10, vol. 7, Jan. 2010, http//www.ieice-hbkb.org/files/10/10gun_07hen_01.pdf, pp. 21.

Ding Jianfeng et al., *Low-Voltage, High Extinction Ratio Carrier-Depletion Mach-Zehnder Silicon Optical Modulator*, SPIE-OSA-IEEE, Nov. 2011, vol. 8308, pp. 6.

International Search Report dated Jun. 13, 2017, issued in PCT Application No. PCT/JP2017/010084, filed Mar. 14, 2017.

International Preliminary Report on Patentability dated Sep. 27, 2018, issued in PCT Application No. PCT/JP2017/010084, filed Mar. 14, 2017.

* cited by examiner

OPTICAL MODULATOR HAVING INTERCONNECTING GROUND ELECTRODES FOR COPLANAR WAVEGUIDES

TECHNICAL FIELD

The present invention relates to an optical modulator for use in an optical communication system and an optical information processing system. More particularly, the present invention relates to an optical modulator structure that is capable of performing fast optical modulation and is excellent in frequency response characteristic.

BACKGROUND ART

Prevalence of high-definition video distribution services and mobile communication has resulted in a vast amount of traffic flowing over networks, which is ever increasing yearly. To create a fast and large-capacity optical network which can meet such a demand on traffic, high-speed operable basic devices for use at individual nodes are actively developed. An optical modulator which directly modulates an optical signal into a broad baseband signal is one of such important devices.

A Mach-Zehnder (MZ) optical modulator is configured to diverge light incident to an optical waveguide into two waveguides with a 1:1 intensity, let the diverged lights propagate by a certain length, and then multiplex the diverged lights back. The MZ optical modulator changes the phases of the two diverged lights by using phase keying units respectively provided in the two diverged optical waveguides. The intensity and phase of light may be modulated by changing the interference conditions of light when two phase-changed lights are multiplexed.

A dielectric substance such as $LiNbO_3$, and a semiconductor such as InP, GaAs or Si are used as materials for the optical waveguide of the MZ optical modulator. The phase of light which propagates through the optical waveguide is changed by inputting a modulation electrical signal to electrodes provided in the vicinity of the optical waveguide comprising those materials to apply a modulation voltage to the optical waveguide.

A primary mechanism for changing the phase of light in the MZ optical modulator is the Pockels effect for the material of $LiNbO_3$, the Pockels effect or the quantum confined stark effect (QCSE) for InP and GaAs, or the carrier plasma effect for Si.

Execution of fast and low power consumed optical communication requires an optical modulator which has a high modulation speed and a low drive voltage. Specifically, it is needed to perform fast optical modulation at a speed of 10 Gbps or higher and with an amplitude voltage of several volts. Meeting the requirement needs a traveling-wave electrode that implements matching of the speed of a fast electrical signal with that of light propagating through a phase modulator, and causes the light and electrical signal to interact with each other while propagating. The optical modulator using a traveling-wave electrode which is several mm to several tens of mm in length has been put into practical use as disclosed in, for example, NPL 1.

The optical modulator using a traveling-wave electrode needs an electrode structure and an optical waveguide structure which provide a low loss and less reflection in order to permit an electrical signal and light which propagate through the waveguide without decreasing the intensities of the electrical signal and the light. That is, an electrode structure that provides a less reflection loss and less propagation loss over a wide frequency band is needed for electrical signals, whereas a waveguide structure that efficiently confines light with less reflection, and enables light propagation without a loss is needed for light.

Mach-Zehnder optical modulators include, as a promising type, a Si optical modulator having an optical waveguide comprising Si from the viewpoint of the material for the substrate and the fabrication process. The Si optical modulator is prepared from an SOI (Silicon on Insulator) substrate having a Si thin film adhered onto an oxide film (BOX: Buried Oxide) layer obtained by thermally oxidizing the surface of the Si substrate. The optical waveguide is prepared by making the Si thin film into thin wires to enable light to be guided through the SOI layer, then doping impurities to enable configuration of a p-type semiconductor and n-type semiconductor, depositing $SiO_2$ to serve as a clad layer for light, forming electrodes, and so forth.

At this time, the optical waveguide should be designed and worked out to make the optical loss small. Specifically, doping of p-type and n-type impurities and the preparation of the electrodes should be designed and worked so as to suppress the occurrence of the optical loss to be small as well as suppress the reflection or loss of fast electrical signals small.

FIG. 1 is a view showing the sectional structure of an optical waveguide on which a Si optical modulator of the related art is based. FIG. 1 shows a cross section (x-z plane) of an optical waveguide 200 formed on an SOI substrate, cut perpendicularly to the traveling direction (y axis) of light, and it is assumed that the light propagates in a direction perpendicular to the figure (y-axial direction). The optical waveguide 200 of the Si optical modulator includes a Si layer 2 sandwiched between upper and lower $SiO_2$ clad layers 1, 3. A central Si thin wire in FIG. 1 for confining light has a structure called a rib waveguide having a difference in thickness. That is, as shown in FIG. 1, the rib waveguide includes a thick Si layer 201 at a central portion, and thin slab regions 202a, 202b located on both sides thereof. The optical waveguide 200 is configured to have a central thick Si layer 201 of the Si layer 2 serving as a core and confine light propagating in the direction perpendicular to the surface of the drawing sheet by utilizing a difference in refractive index between the central thick Si layer 201 and the surrounding $SiO_2$ clad layers 1, 3.

A heavily p-doped semiconductor layer 211 and a heavily n-doped semiconductor layer 214 are respectively provided in the thin slab regions 202a, 202b on the respective sides of the optical waveguide core of the thick Si layer 201. Furthermore, a pn junction structure provided by an intermediate p-doped semiconductor layer 212 and an intermediate n-doped semiconductor layer 213 is formed in the optical waveguide core of the Si layer 201 and in a vicinity thereof. As will be described later, a modulation electrical signal and a bias voltage are applied from left and right ends of the Si layer 2 in FIG. 1 via electrodes (not shown). Instead of the pn junction at the central portion of the core, a pin structure having an undoped i-type (intrinsic) semiconductor held in the pn junction structure provided by the intermediate p-doped semiconductor layer 212 and the intermediate n-doped semiconductor layer 213 may be used.

The phase modulation operation in the optical waveguide 200 of the Si optical modulator may be explained as follows. Although not shown in FIG. 1, two metal electrodes which are formed, in contact with, in the heavily p-doped semiconductor layer 211 and the heavily n-doped semiconductor layer 214 at both ends of the Si layer 2. A reverse bias voltage, together with a modulation electrical signal of a radio frequency (RF), is applied to the central pn junction of the core via the two metal electrodes. That is, a voltage with a positive potential on the heavily n-doped semiconductor layer 214 side and a negative potential on the heavily p-doped semiconductor layer 211 side is applied from the right end to the left end (x-axial direction) of the optical waveguide 200. The reverse bias voltage and the modulation electrical signal change the carrier density inside the core of the thick Si layer 201. The change in carrier density changes the refractive index of the core 201 of the optical waveguide due to the carrier plasma effect, thus enabling modulation of the phase of the light propagating through the core of the optical waveguide.

The size of the optical waveguide in the Si optical modulator depends on the refractive index of each material to be the core/clad. As an example of the rib type silicon waveguide structure having the core part of the thick Si layer 201 and the slab regions 202a, 202b on the respective sides thereof as shown in FIG. 1, the width of the optical waveguide core 201 (x-axial direction) is 400 to 600 (nm), the height of the core part (z-axial direction) is 150 to 300 (nm), the thicknesses of the slab regions are 50 to 200 (nm), and the length of the optical waveguide (y-axial direction) is about several mm.

One of the excellent features of the Si optical modulator is that the difference between the refractive index of Si serving as the core through which light propagates and that of $SiO_2$ of the clad layer is so large to enable configuration of a compact optical modulator. The large difference in refractive index makes it possible to confine light to small space, so that the bending radius of the optical waveguide can be made as extremely small as 10 μm or so. This makes it possible to configure the light multiplexing/demultiplexing circuit part in the Si optical modulator small, which will be described next.

FIG. 2 is a view showing a Si optical modulator constituting an MZ optical modulator having a dual electrode structure according to a related art. FIG. 2 is a top view which vertically shows a Si (SOI) substrate surface (x-y plane) on which electrodes are formed, and in which those elements which are formed inside the substrate and are not directly observable are illustrated perspectively. An optical input 22 from the left-side end of the optical modulator in FIG. 2 is input to the optical waveguide, diverged to two optical waveguides 7a, 7b, and merged again, so that modulated light 23 is output from the right-side end of the optical modulator. While propagating through the diverged two optical waveguides 7a, 7b in the y-axial direction, the input light 22 is phase-modulated by modulation electrical signals (RF signals) respectively applied to upper RF electrodes 15a, 15b. In the optical modulator, a coplanar waveguide (CPW) is made up by the RF electrode 15a located upper in the figure and two ground electrodes 16a, 17 sandwiching the RF electrode 15a. In addition, a CPW is made up by the RF electrode 15b located lower in the figure and two ground electrodes 16b, 17 sandwiching the RF electrode 15b. Because of the configuration including two RF signal input sections in one MZ optical modulator, the MZ optical modulator in FIG. 2 is also called a dual electrode structure. The optical modulator in FIG. 2, viewed as a whole, has a symmetrical structure to the center line parallel to the y axis passing through the center of the ground electrode 17. In the vicinity of the two optical waveguides 7a, 7b, there are two corresponding sets of semiconductor regions 211a, 212a, 213a, 214a and semiconductor regions 211b, 212b, 213b, 214b which are formed inside the substrate.

FIG. 3 is a view showing a cross section including line III-III of the Si optical modulator according to the related art shown in FIG. 2. The sectional structural view of FIG. 3 shows a phase modulation section including a CPW corresponding to one optical waveguide 7a to be modulated. One phase modulation section includes an RF electrode 15a which is a radio-frequency line for inputting one of differential electrical signals (RF signals) of a differential structure to a rib waveguide having the same sectional structure as the one in FIG. 1, and two ground electrodes 16a, 17 provided so as to sandwich the RF electrode 15a. A single optical waveguide core 7a is provided between the RF electrode 15a and the ground electrode 16a, with a pn junction structure formed within the optical waveguide 7a by the intermediate p-doped semiconductor layer 212 and the intermediate n-doped semiconductor layer 213. The RF electrode 15a is in contact with the heavily n-doped semiconductor layer 214 through a via 19b. In addition, the ground electrode 16a is in contact with the heavily p-doped semiconductor layer 211 through the via 19a.

Although the other ground electrode 17 is not in contact with any semiconductor layer, a radio-frequency transmission line (CPW) having a GSG (Ground Signal Ground) structure is formed for the RF electrode 15a together with the ground electrode 16a. This transmission line structure makes it possible to adjust the characteristic impedance of the RF electrode as the transmission line to improve the transmission characteristic. In addition, the signal line based on the RF electrode 15a is surrounded by the two ground electrodes 16a, 17, suppressing leakage of signals, so that it is possible to form an optical modulator with less crosstalk and propagation loss. While FIG. 3 shows the phase modulation section including one RF electrode 15a which is a radio-frequency line, the phase modulation section including the other RF electrode 15b likewise has a similar structure as shown in FIG. 3 except that the layout order of a plurality of semiconductor regions in the x-axial direction is reversed with the z axis as the axis of symmetry.

The characteristic impedances of the RF electrodes 15a, 15b of the Si optical modulator as the radio-frequency transmission lines are significantly affected by the capacitances of the pn junctions of the optical waveguide cores 7a, 7b of the Si layer. In the dual electrode Si optical modulator, the characteristic impedance is adjusted comparatively easily by adjusting the capacitance between the RF electrode 15a and the ground electrode 17. It is possible to set the characteristic impedance to about 50Ω for a single-ended drive configuration and about 100Ω for a differential drive configuration.

Although the description of FIG. 3 has been given by way of a configurational example where the RF electrode 15a is in contact with the heavily n-doped semiconductor layer 214 and the ground electrode 16a is in contact with the heavily p-doped semiconductor layer 211, the orientation of the pn junction may be reversed so that the RF electrode 15a is in contact with the heavily p-doped semiconductor layer and the ground electrode 16a is in contact with the heavily n-doped semiconductor layer. In this case, a negative voltage may be applied to the ground electrode 16a as a bias voltage which is superimposed on the RF signal to be applied to the RF electrode 15a, so that the pn junction can be reversely biased.

CITATION LIST

Non Patent Literature

NPL 1: Kazuhiro Goi, Kenji Oda, Hiroyuki Kusaka, Kensuke Ogawa, Tsung-Yang Liow, Xiaoguang Tu, Guo- Qiang Lo, Dim-Lee Kwong, "20 Gbps binary phase shift keying using silicon Mach-Zehnder push-pull modulator," the Society Conference of IEICE 2012, C-3-50, 2012

NPL 2: IEICE, Forest of Knowledge, "Monolithic Microwave Integrated Circuit," Series 10, Volume 7: http://www.ieice-hbkb.org/files/10/10gun_07hen_01.pdf

SUMMARY OF INVENTION

Technical Problems

Implementation of large-capacity optical communication needs an optical modulator capable of modulating light at a high speed. To carry out fast light modulation, the optical modulator should have a frequency response characteristic that enables its operation over a wide frequency band of several hundred kHz to several tens of GHz.

FIG. 4 is a diagram exemplarily showing the ideal propagation state of a modulation signal in a dual electrode Si optical modulator having a CPW structure. As described above, an RF electrode 15a in an upper portion of FIG. 4 is constituted by a CPW sandwiched between two ground electrodes 16a and 17. In the CPW, with a single RF electrode 15a sandwiched between the ground electrodes 16a and 17 on its both sides, a radio-frequency signal propagates on the RF electrode 15a. The propagation of a radio-frequency signal may be electromagnetically explained as a model in which a dense-charge portion and a coarse-charge portion migrate like a wave on a radio-frequency transmission line, e.g., the RF electrode 15a. In this model, the propagation may be understood as such an action that when a dense-charge portion propagates, a dense-charge portion with an opposite positive/negative polarity is induced by the Coulomb interaction on the ground electrode or the RF electrode which is paired with a differential line, and migrates like a radio-frequency signal.

FIG. 4 shows the propagation state of a modulation signal according to the aforementioned charge migration model. A CPW is one of imbalanced lines in which the charges on an RF line are balanced with the charges of the opposite polarity respectively induced on two ground electrodes. In FIG. 4, as an RF signal 21a is input, positive charges 26 and negative charges alternately appear on the RF electrode 15a at a certain time in a y-axial direction which is the propagation direction of an electrical signal. In correspondence to portions on the RF electrode 15a where, for example, positive charges 26 are dense, portions 24, 25 where negative charges of the opposite polarity are dense appear on each of the two ground electrodes 16a, 17.

In an ideal CPW, as shown in FIG. 4, the charges on the two ground electrodes 16a, 17, together with the charges on the RF electrode 15a, propagate in the y-axial direction. For example, the charges in an x-axial direction on line X-X' of an output end of the optical modulator at a certain time behave like a distribution 27. The polarity of the charges of each electrode varies on line X-X' with passage of time. The RF signal 21a input from the left end in the figure propagates while imparting a modulation effect on the optical waveguide 7a, and will be terminated by a terminal resistor connected to the right end of the RF electrode 15a (not shown). In the CPW of the practical Si optical modulator, however, the non-symmetry of the transmission lines causes non-symmetrical migration of charges, which raises a problem such that the modulation signal 21a cannot be efficiently applied to the RF electrode 15a.

FIG. 5 is a diagram exemplarily showing the actual propagation state of a modulation signal in a dual electrode Si optical modulator having a CPW structure. In the dual electrode Si optical modulator, the ground electrode 16a is located on one side of the RF line 15a with the optical waveguide 7a in between, and the ground electrode 17 without the corresponding optical waveguide is located on the other side. The ground electrode 17 is needed to carry out the function of adjusting the characteristic impedance of the RF line 15a. In general, what affects the Coulomb force which acts due to the charges propagating through the RF line in the transmission line is a region that determines the capacitance of the RF line. Between the RF electrode 15a and the first ground electrode 16a, therefore, the pn junction portion (depletion layer) of the Si optical modulator mainly determines the capacitance. Between the RF electrode 15a and the second ground electrode 17, on the other hand, it is the interval between those electrodes that mainly determines the capacitance. With regard to the former, first ground electrode 16a, since the depletion layer of the pn junction is very thin, the capacitance is amazingly large. With regard to the latter, second ground electrode 17, since the distance between the electrodes is extremely large compared with the thickness of the depletion layer, the capacitance is small. Since the capacitance of the first ground electrode 16a differs significantly from the capacitance of the second ground electrode 17, the speeds of the charges respectively propagating through the two ground electrodes 16a, 17 also considerably differ from each other.

Referring to FIG. 5, it is shown that the charges propagating on the ground electrode 16a are relatively slower than the charges propagating on the ground electrode 17. There are two portions on the ground electrode 17 where positive charges are dense, whereas there are three portions on the ground electrode 16a where positive charges are dense. This shows that waves with a greater wavenumber which have been input in the past remain unpassed through the transmission line, thus remaining on the ground electrode 16a, and that the propagation speed of the charges is slow. If the propagation speed of the charges differs between the two ground electrodes, as in the example of the model of FIG. 5, as the radio-frequency signal propagates on the RF electrode 15a, the charges of the opposite polarity, which are induced by the charges on the RF electrode 15a and respectively propagate on the two ground electrodes 16a, 17, increase their phase difference. As a result, when an electrical signal of a certain frequency propagates on the RF electrode 15a on the y axis by a certain distance, as shown in FIG. 5, "positive" charges 32 are induced on the ground electrode 16a on one side, while "negative" charges 33 are induced on the ground electrode 17 on the other side.

In this state, the charges on the two ground electrodes 16a, 17 are balanced, so that the charges on the RF electrode 15a become 0, and the charges in the x-axial direction on line X-X' in FIG. 5 behave like a distribution 28. At the frequency that produces the charge distribution in which the charges at a certain position of the RF electrode 15a become 0 (node), even if the phase of the RF signal propagating changes over time, the charges on the RF electrode 15a are always 0, so that an RF signal is not output. The state in the vicinity of the output end of the RF electrode 15a substantially becomes the same as the state where a voltage is not applied. Consequently, the RF input signal 21a from the left end of the optical modulator comes in the same state where it is not uniformly applied to the optical waveguide 7a in the entire length of the RF electrode 15a at a certain frequency, so that the efficiency of phase-modulating the optical modulator 7a drops.

FIGS. 6A and 6B are diagrams showing the results of measurement of S parameters of an electrical signal path in the dual electrode Si optical modulator according to the related art. In the dual electrode Si optical modulator of FIG. 2 according to the related art, an S parameter is measured with one end (e.g., left end) of the RF electrode 15a serving as an input and the other end serving as an output, FIG. 6A showing an S parameter ($S_{21}$) for the transmission characteristic while FIG. 6B shows an S parameter ($S_{11}$) for the reflection characteristic. The length of the RF electrode in the y-axial direction of the optical modulator is 6 mm.

At the output end (left end) of the RF electrode 15a, the frequency at which the phase difference of the charges in propagation between the ground electrode 16a and the ground electrode 17 becomes $\pi$ and the output signal from the RF electrode 15a always be 0 depends on the entire length of the RF electrode, and the difference between the phase speed of the signal (charges) propagating between the RF electrode 15a and the ground electrode 16a and the phase speed of the signal (charges) propagating between the RF electrode 15a and the ground electrode 17. That is, the frequency changes according to the difference between the capacitance values respectively relating to the two ground electrodes 16a, 17.

In the transmission characteristic ($S_{21}$) shown in FIG. 6A, a transmission signal is significantly attenuated near 11 GHz, and the characteristic impedance also changes significantly due to the change in transmission mode, whereas in the reflection characteristic ($S_{11}$) shown in FIG. 6B, the amount of reflection also becomes large. Further, near 31 GHz where the phase difference becomes $3\pi$, likewise, a reduction in transmission energy and an increase in the amount of reflection can be observed. Such a large variation which depends on the frequencies for the transmission characteristic and the reflection characteristic of the RF signal input to the RF electrode inherently raises a significant problem for an optical modulator which demands for a flat response operation over a wide frequency band of several hundred kHz to several tens of GHz.

In order to prevent the phase difference of the charges in propagation between the two ground electrodes 16a, 17, i.e., the phase difference of the ground current from becoming $\pi$ at the output end of the modulation electrode having the CPW structure, the optical modulator according to the related art has adopted the following methods as shown in FIG. 5. One method is to shorten the entire length of the optical modulator and terminate the propagation of the radio-frequency signal on the modulation electrode before occurrence of a phase difference between the two ground electrodes 16a and 17. However, shortening the modulator length shortens the distance over which the signal is effectively phase-modulated, thus reducing the modulation efficiency. To cause a necessary change in refractive index in the core of the optical waveguide, the required amplitude of the modulation RF signal becomes large. This is contrary to the demand for the low drive voltage for the optical modulator.

Another method is to suppress the difference between the capacitance of the pn junction portion between the RF electrode 15a and the ground electrode 16a of the Si optical waveguide, and the capacitance based on the interelectrode interval between the RF electrode 15a and the ground electrode 17. Suppressing the difference between the two capacitances can make the difference between the speeds of the propagating charges smaller. Specifically, the capacitance between the RF electrode 15a and the ground electrode 17 whose interelectrode interval is smaller is increased. However, increasing the capacitance relating to the ground electrode 17 brings about a problem of decreasing an electric field to be applied to the optical waveguide, thereby reducing the modulation efficiency.

Such a problem originated from the imbalance of the charges on the ground electrodes occurs at a bending portion of the CPW. Radio-frequency interconnection using a substrate other than an SOI type according to the related art has adopted a CPW in which the intervals between a signal electrode and ground electrodes are asymmetrical, or a structure that eliminates the phase difference of the ground current generated at the bending portion of the CPW.

FIGS. 7A and 7B are diagrams showing structural examples of an air bridge which short-circuits two ground electrodes according to related arts. FIG. 7A shows an air bridge 30 that connects two ground electrodes on both sides of a signal electrode so as to short-circuit between the ground electrodes. The potentials at the portions connected by the air bridges 30 between the ground electrodes can be equalized. There is a phase difference between waves of the charges flowing on the two ground electrodes in the CPW in which the intervals between the signal electrode and the ground electrodes are asymmetrical, or at the bending portion of the CPW line. Since this phase difference is also a potential difference, short-circuiting between the two ground electrodes by the air bridges 30 may eliminate the phase difference to suppress degradation of an electrical signal propagating through the signal electrode.

FIG. 7B shows the cross section of an air bridge 31 used in a monolithic microwave integrated circuit (MMIC), in which an air bridge is prepared by plated wiring or the like (NPL 2). Since multilayer electrical interconnections are available in MMICs, it is possible to prepare intersecting electrode interconnections or the like separated by an interlayer insulating film. The reason for providing an interconnection in an MMIC by the air bridge 31 is that propagation of a radio-frequency signal through the signal electrode inhibits ground interconnections from being disposed close to the signal electrode. Because of the short-circuited two ground electrodes, the characteristics of the radio-frequency signal may be affected by the use of the interlayer interconnections in the MMIC which are separated by a very close distance of a submicron order to about 1 to 2 µm by the interlayer insulating film having a relative dielectric constant of about 2.5 to 4.0. In order to prevent the two short-circuited ground electrodes from influencing a radio-frequency signal propagating through the signal electrode, it is necessary to use the air bridges 31 separated by several µm to a dozen or so µm by air, not the interlayer interconnection of the MMIC.

However, the prevailing use of a plated Au wiring to prepare an air bridge makes it difficult to fabricate the air bridge in the CMOS compatible process used in fabricating a Si modulator. The Si-CMOS process has been optimized in response to the demand for microfabrication, and Au wiring which cannot form etching-based patterns is not generally used. Further, the MMIC fabrication process shown in FIG. 7B in which Au wiring is formed by the lift-off process or plating suffers problems such as formation of burrs and a failure to form micropatterns. Therefore, an attempt to fabricate an air bridge for short-circuiting two grounds in a Si optical modulator requires that the ground electrodes should be bridge-wired with a wiring line after fabricating an optical modulator device. In order to short-circuit the ground electrodes with the wiring line, it is necessary to control the wire length of several tens of µm, and it is costly to interconnect a plurality of wires. Furthermore, there is a problem that the device yield decreases due to a possible damage to the electrodes of the optical modulator, which may occur in the wire bonding process. Therefore, it is difficult to directly apply each of the bridge structures as shown in FIGS. 7A and 7B to a Si optical modulator characterized to configure a compact optical modulator and utilizing an inexpensive CMOS compatible process.

The present invention has been made in light of the above problems, and it is an objective of the present invention to provide a wideband optical modulator, at a low cost, that eliminates a phase difference of return currents propagating through two ground electrodes in a dual electrode Si optical modulator having a CPW structure, thereby suppressing degradation of the frequency response characteristic.

Solution to Problems

According to one aspect of the present invention, there is disclosed a Si optical modulator having at least two sets of coplanar waveguides (CPWs) formed on a substrate, each CPW including a signal electrode to which a radio-frequency (RF) signal is applied, wherein each CPW includes: the signal electrode; a first ground electrode disposed on one side of the signal electrode with an optical waveguide formed inside the substrate in between; and a second ground electrode disposed on an other side of the signal electrode, the optical waveguide comprising a rib waveguide having a center core and slab regions on respective sides thereof, and wherein the first ground electrode is connected to one of the slab regions by an interlayer interconnection, the signal electrode is connected to the other one of the slab regions by an interlayer interconnection, and the first ground electrode and the second ground electrode are connected to each other by one or more interconnecting electrodes passing between the signal electrode and the optical waveguides in a thicknesswise direction of the substrate.

Advantageous Effects of Invention

The present invention can provide, at a low cost, a wideband optical modulator that eliminates a phase difference of return currents propagating through two ground electrodes in a dual electrode Si optical modulator having a CPW structure, thereby suppressing degradation of the frequency response characteristic.

DESCRIPTION OF EMBODIMENTS

An optical modulator according to the present invention is a dual electrode Si optical modulator having a CPW electrode structure, and eliminates a phase difference of return currents propagating through two ground electrodes by means of an interconnection between the two ground electrodes. The use of a process compatible with CMOS provides the structure of an optical modulator that suppresses the degradation of the frequency response characteristic. The interconnection between the ground electrodes is prepared by the process compatible with CMOS, not an air bridge or a wiring line according to the related art. This makes it possible to provide an optical modulator at a low fabrication cost and with suppressed degradation of a radio-frequency signal, providing a good waveform quality at the time of fast modulation.

The following describes specific embodiments of the optical modulator of the present invention in detail in conjunction with the accompanying drawings.

First Embodiment

Figure 8:
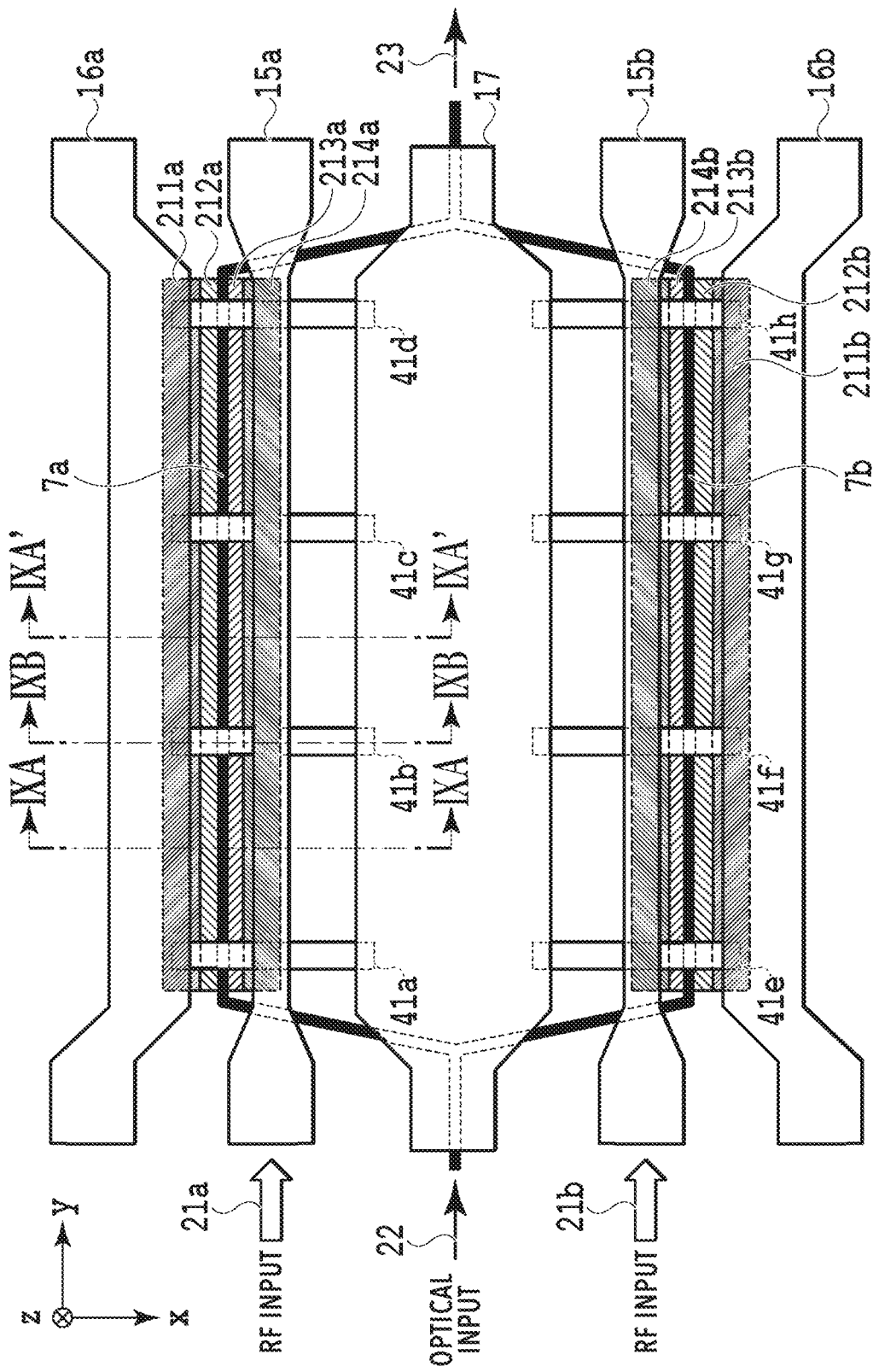
FIG. 8 is a diagram showing the configuration of a dual electrode Si optical modulator according to a first embodiment.

FIG. 8 is a diagram showing the configuration of a dual electrode Si optical modulator according to a first embodiment of the present invention. FIG. 8 is a top view perpendicularly viewing a Si (SOI) substrate surface (x-y plane) having electrodes formed thereon, and perspectively showing elements which are formed inside the substrate and are hardly viewable directly. An optical input 22 from the left-side end of the optical modulator in FIG. 8 is input to the optical waveguide, is diverged into two optical waveguides 7a, 7b, and is then merged so that modulation light 23 is output from the right-side end of the optical modulator. The configuration of the optical modulator in FIG. 8 is substantially identical to the configuration of the optical modulator according to the related art shown in FIG. 2. The optical modulator is also identical in that a CPW is constituted by an upper RF electrode 15a in the figure and two ground electrodes 16a, 17 sandwiching the RF electrode 15a, and a CPW is constituted by a lower RF electrode 15b in the figure and two ground electrodes 16b, 17 sandwiching the RF electrode 15b. The optical modulator of the present invention differs from the related art in that the two ground electrodes 16a, 17 sandwiching the respective one of the RF electrodes 15a, 15b formed by the CPW, and the two ground electrodes 16b, 17 sandwiching the respective RF electrode are connected at a plurality of locations by interconnecting electrodes 41a to 41h. The interconnecting electrodes will be described further in detail referring to the subsequent cross-sectional views. The RF electrode is also called signal electrode in the following description.

Figure 9A:
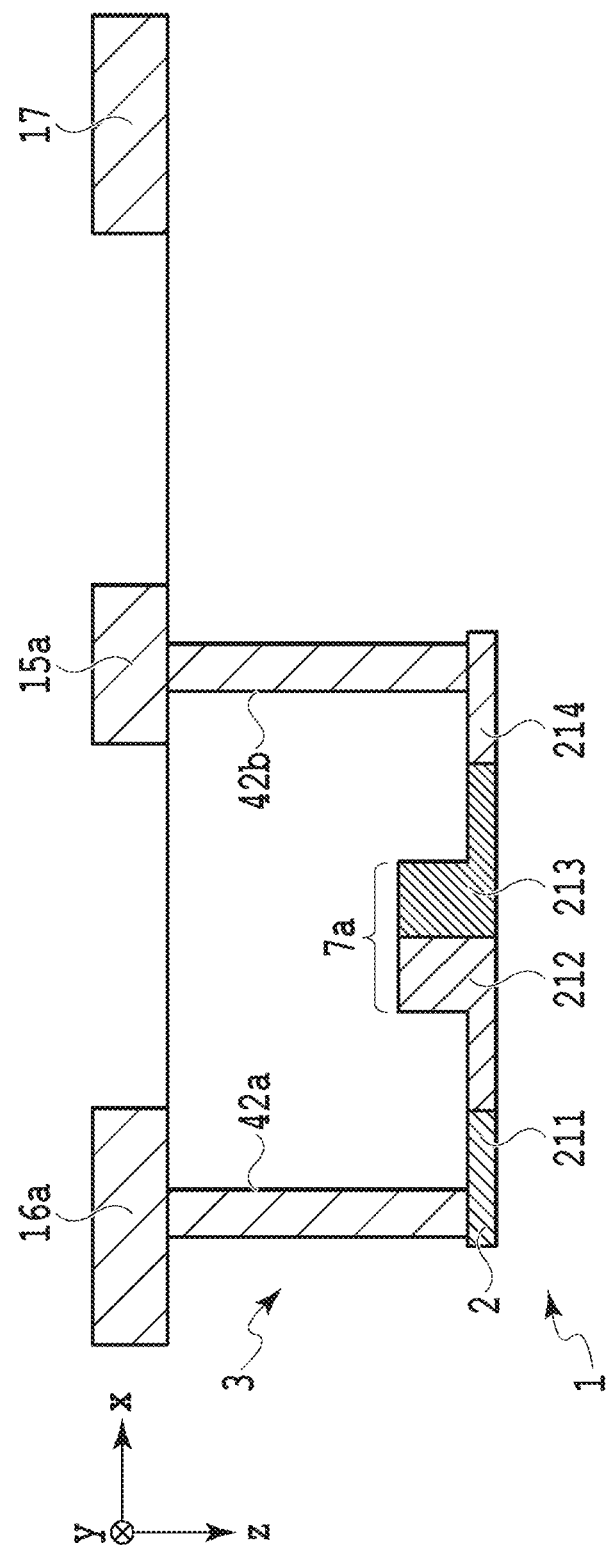
FIG. 9A is a cross-sectional view of a portion that does not include interconnecting electrodes of the Si optical modulator according to the first embodiment.
Figure 9B:
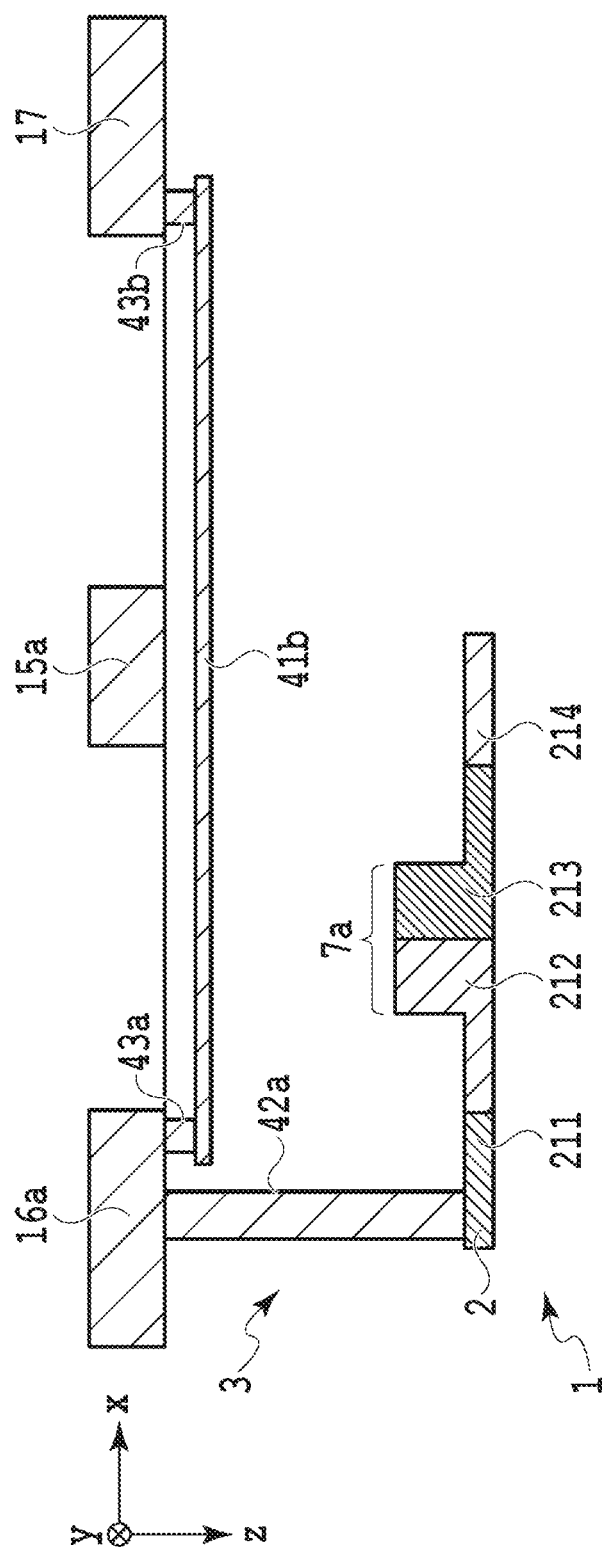
FIG. 9B is a cross-sectional view of a portion that does not include the interconnecting electrodes of the Si optical modulator according to the first embodiment.

FIGS. 9A and 9B are diagrams showing the cross sections of individual parts of the dual electrode Si optical modulator according to the first embodiment of the present invention. FIG. 9A shows the structure of a cross section along line IXA-IXA in FIG. 8 or a cross section along line IXA'-IXA', the cross section being perpendicular to the optical waveguide. FIG. 9B shows the structure of a cross section (x-z plane) along line IXB-IXB in FIG. 8, including interconnecting electrodes, the cross section being perpendicular to the optical waveguide. FIG. 9A shows a configuration similar to the configuration of the dual electrode Si optical modulator according to the related art shown in FIG. 2. That is, a single Si waveguide core 7a is provided between the RF electrode 15a and the ground electrode 16a, and a pn junction structure is formed inside the Si waveguide core 7a by an intermediate p-doped semiconductor layer 212 and an intermediate n-doped semiconductor layer 213. The RF electrode 15a is in contact with a heavily n-doped semiconductor layer 214 through a via 42b. The ground electrode 16a is in contact with a heavily p-doped semiconductor layer 211 through a via 42a. The via 42b and the via 42a may be cylindrical vias or prismatic vias. Therefore, those vias may be disposed in a plural quantity along the optical waveguide 7a in the y-axial direction. The via 42b and the via 42a may also be continuous vias continuously formed in a wall shape in the light propagation direction (y-axial direction) in the optical waveguide 7a. The via 42a for the interlayer interconnection may be a plurality of, for example, prismatic or cylindrical vias if a plurality of vias are disposed in the y-axial direction. The vias may be, for example, 0.5 µm in diameter or side length, and may be disposed, for example, at intervals of 0.5 µm (cycle period of 1 µm).

FIG. 9B shows a cross section including the interconnecting electrode 41b, with the two ground electrodes 16a, 17 being connected together by the interconnecting electrode 41b formed inside a $SiO_2$ clad layer 3 of the substrate. Normally, this interconnecting electrode 41b in use has only to be linear, so that the two ground electrodes 16a, 17 are connected together by the interconnecting electrode 41b without forming a via which is connected to a Si semiconductor layer 214 from the RF electrode 15a. Accordingly, the interconnecting electrode 41b which connects the two ground electrodes 16a, 17 is not in contact with the RF electrode 15a and the via 42b which is connected to the semiconductor layer 214 from the RF electrode 15a. This interconnecting electrode 41b equalizes the potential between the two ground electrodes 16a, 17, thus eliminating the phase difference of the return currents (the phase difference of the charges propagating through the ground electrodes), which are induced on the two ground electrodes 16a, 17 by a radio-frequency electrical signal on the RF electrode 15a and propagate through the two ground electrodes 16a, 17. It is possible to prepare a wideband Si optical modulator with suppressed transmission and reflection properties of an input radio-frequency signal 21a to the RF electrode 15a.

Accordingly, the present invention may be implemented as a Si optical modulator having at least two sets of coplanar waveguides (CPWs) formed on a substrate, each CPW including a signal electrode to which a radio-frequency (RF) signal is applied, wherein each CPW includes: the signal electrode; a first ground electrode disposed on one side of the signal electrode with an optical waveguide formed inside the substrate in between; and a second ground electrode disposed on an other side of the signal electrode, the optical waveguide comprising a rib waveguide having a center core and slab regions on respective sides thereof, and wherein the first ground electrode is connected to one of the slab regions by an interlayer interconnection, the signal electrode is connected to the other one of the slab regions by an interlayer interconnection, and the first ground electrode and the second ground electrode are connected to each other by one or more interconnecting electrodes passing between the signal electrode and the optical waveguides in a thickness-wise direction of the substrate.

The CPW constituted by one RF electrode 15b and two ground electrodes 16b, 17 in the MZ optical modulator likewise have structures similar to the those described above referring to FIGS. 9A and 9B. It is to be noted however that the layout of the individual elements in the x-axial direction perpendicular to the light propagation direction in the optical waveguide becomes symmetrical between two CPWs to a center line parallel to the y axis of the central ground electrode 17 in the top view of FIG. 8. Further, the layout of the individual elements is reversed between two CPWs to the x-axial direction in the cross-sectional views of FIGS. 9A and 9B. The function and effect of the interconnecting electrodes 41e to 41h in the lower CPW are quite the same as those of the interconnecting electrodes 41a to 41d in the upper CPW.

Figure 7A:
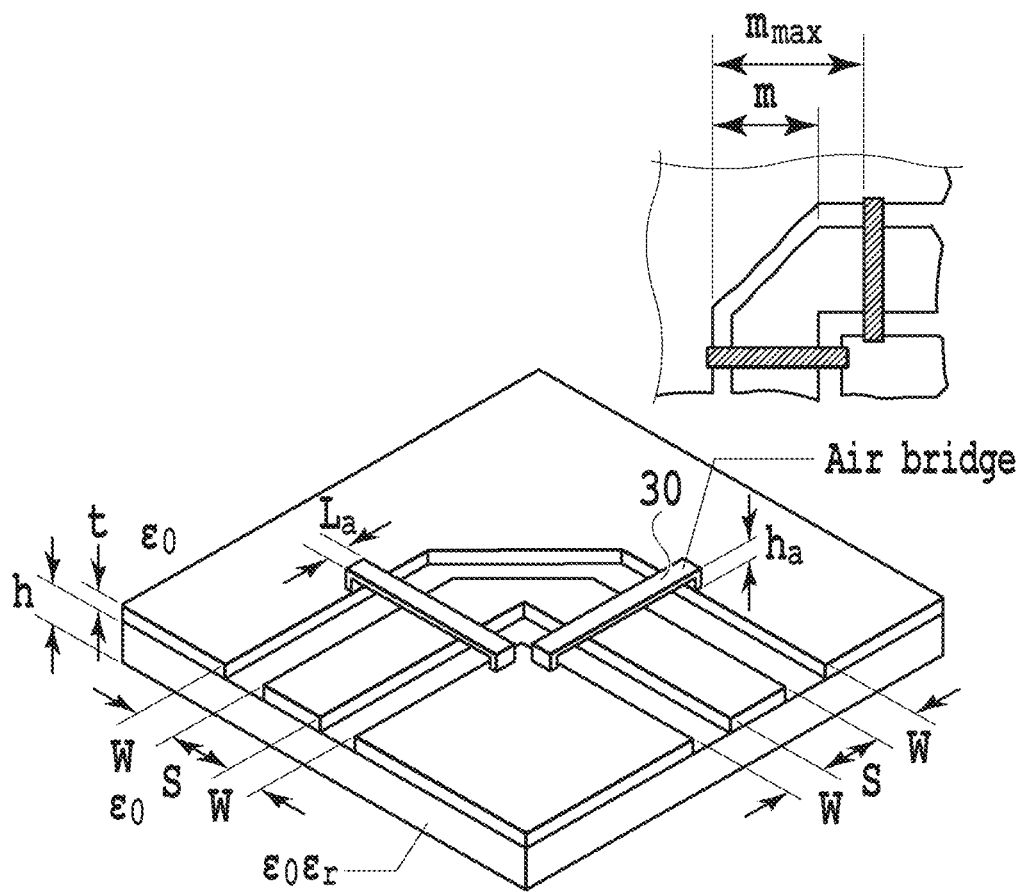
FIG. 7A is a diagram showing a structural example of an air bridge which short-circuits ground electrodes according to a related art.
Figure 7B:
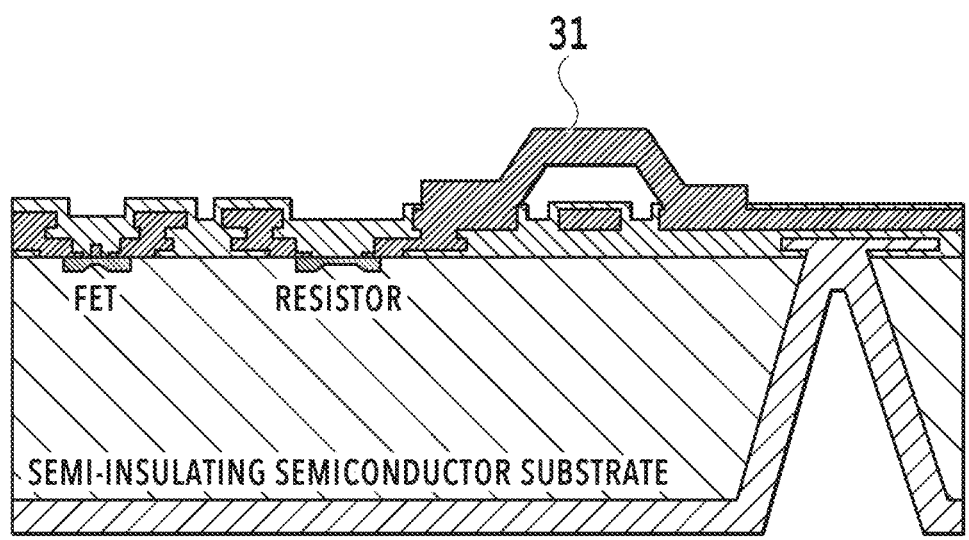
FIG. 7B is a diagram showing another structural example of the air bridge which short-circuits the ground electrodes according to a related art.

In the configuration of the Si optical modulator according to the present invention shown in FIGS. 8, 9A and 9B, the electric field of a radio-frequency signal propagating through the RF electrode 15a is concentrated at the pn junction portion in the optical waveguide 7a of the Si optical modulator. In the MMIC according to the related art shown in FIG. 7B, if the two grounds are short-circuited by the bridge-wiring between the ground electrodes using the interlayer interconnection, the interlayer interconnection and the RF electrode come very close to each other, thus degrading the radio frequency characteristic. To avoid this degradation, the MMIC of the related art should have the grounds short-circuited by an air bridge separated from the RF electrode and separated between the electrodes by air having a small dielectric constant or wiring line.

In the Si optical modulator of the present invention, by way of contrast, the electric field applied to the RF electrode 15a is mostly concentrated at the pn junction portion formed in the optical waveguide. If the interconnecting electrode 41b which connects the two ground electrodes is located apart from the pn junction portion formed in the Si waveguide core 7a where the electric field is concentrated, therefore, the interconnecting electrodes can be formed while suppressing the degradation of the radio frequency characteristic. In other words, it is less necessary to distance the RF electrode 15a on the substrate surface away from the interconnecting electrodes, and the interconnecting electrodes for the ground electrodes should be formed at a distance from the Si waveguide core 7a which is long enough not to cause the degradation of the radio frequency characteristic.

Figure 11:
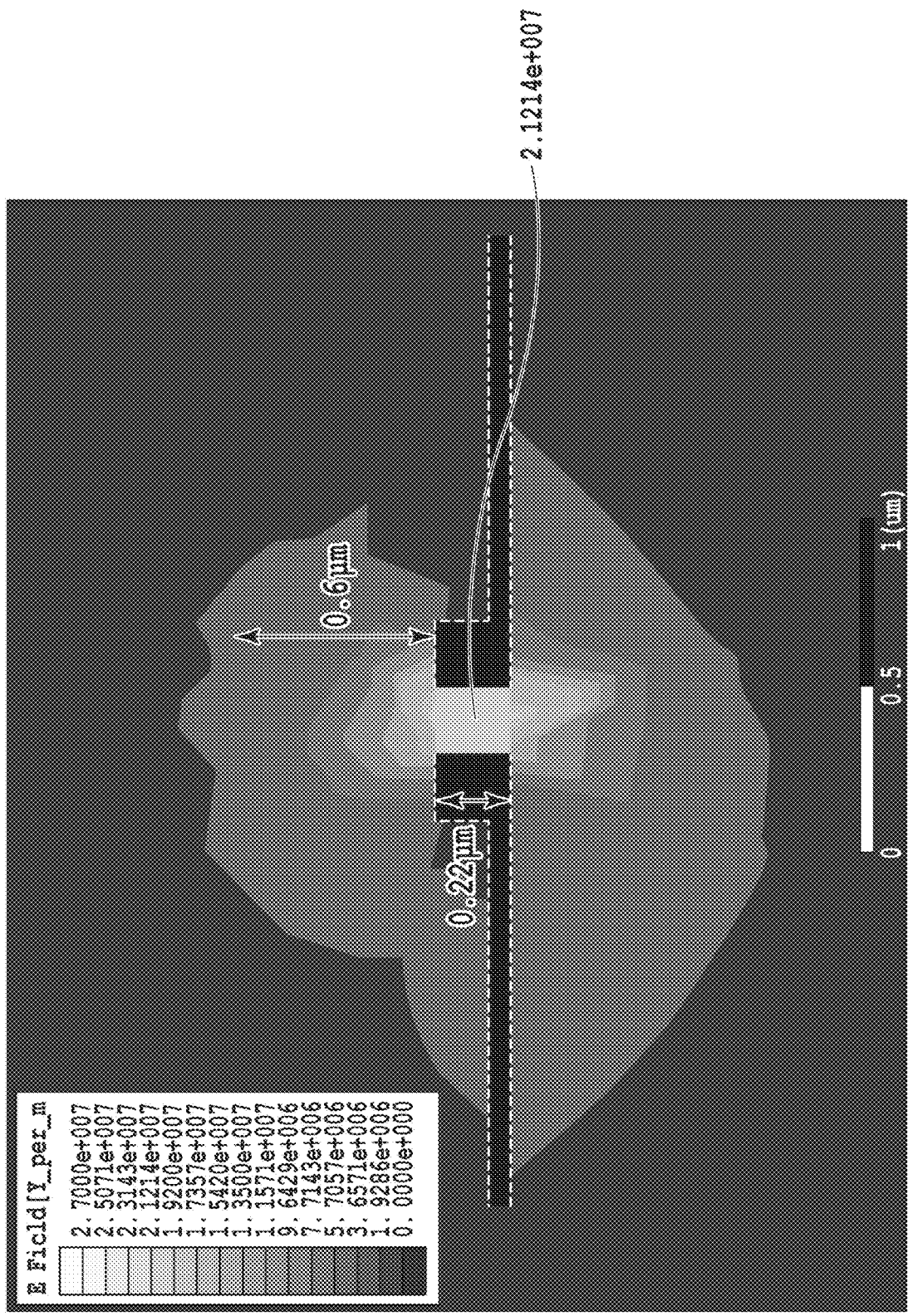
FIG. 11 is a diagram showing an electric field distribution near a pn junction when a modulation electrical signal is applied to the Si optical waveguide.

FIG. 11 is a diagram showing an electric field distribution near a pn junction when a modulation electrical signal is applied to the Si optical waveguide. The figure shows the results of conducting simulation on an electric field distribution using a finite element scheme under the conditions where the rib portion of the optical waveguide is 0.22 µm in height and 600 nm in width, a depletion layer formed at the pn junction portion is 200 nm in thickness, and 1 V is applied to the pn junction. In the Si optical modulator, light propagating through the optical waveguide is strongly confined in the core 7a at the rib portion of the Si layer. Since a radio-frequency electric field is also concentrated at the pn junction portion, however, the electric field distribution in the RF electrode 15a is limited. In light of the above, the degradation of the radio frequency characteristic can be suppressed by forming the interconnecting electrode 41b in FIG. 9B at a position of about 1.0 µm apart from the Si waveguide core 7a in terms of the layer thickness (z-axial direction). As shown in FIG. 11, since the electric field extends from the topmost portion of the Si waveguide core 7a to a position of about 0.6 µm apart therefrom, it is understood that to form the interconnecting electrodes 41 so as not to degrade the radio frequency characteristic of the modulation signal, the interconnecting electrodes should be provided at positions of 0.6 µm or more apart from the topmost surface of the rib waveguide. If the interlayer distances (z-axial direction) between the RF electrode 15a and the interconnecting electrodes 41 are also set to a submicron order to about 1 to 2 µm, the degradation of the radio frequency characteristic of the modulation signal can be suppressed substantially. The Si optical modulator of the present invention may have the interconnecting electrodes 41a to 41h formed by the structure that would make it difficult to secure a radio frequency characteristic in an MMIC or the like.

The individual interconnecting electrodes 41a to 41h should normally be bridge type electrodes which linearly connect two ground electrodes 16a, 17 as shown in FIG. 8. In a case of using vias, however, the interconnecting electrodes do not have a simple shape such as a linear shape, but may be shaped to be routed around to the front side or the depth side (in the y-axial direction) on the figure directly under the RF electrode 15a as seen in FIG. 9B to avoid the via 42b. This may permit the via 42b which connects the RF electrode 15a and the heavily n-doped semiconductor layer 214 to remain, unlike the via being not formed in FIG. 9B. In addition, the phase difference of the return currents propagating through the two ground electrodes 16a, 17 should be eliminated in a direction perpendicular to the y axis of the two ground electrodes 16a, 17 by the interconnecting electrodes. Therefore, even if the structure of causing the interconnecting electrodes to extend perpendicularly from the first ground electrode 16a and the second ground electrode 17 and be routed around to avoid the via is adopted, it is still desirable to implement structures that provides a substantially identical positional relationship perpendicular to the y axis. Therefore, the cross-sectional structures as shown in FIGS. 9A and 9B are merely examples of the interconnecting electrodes according to the present invention. Further, the layout interval of the interconnecting electrodes 41a to 41h in the y-axial direction shown in FIG. 8 may vary depending on the difference between the phase speeds (difference in capacitance) of the RF signals (return currents) propagating between the RF electrode 15a and the two ground electrodes 16a, 17, respectively, and the required operational frequency band of the optical modulator and the like.

Figure 10:
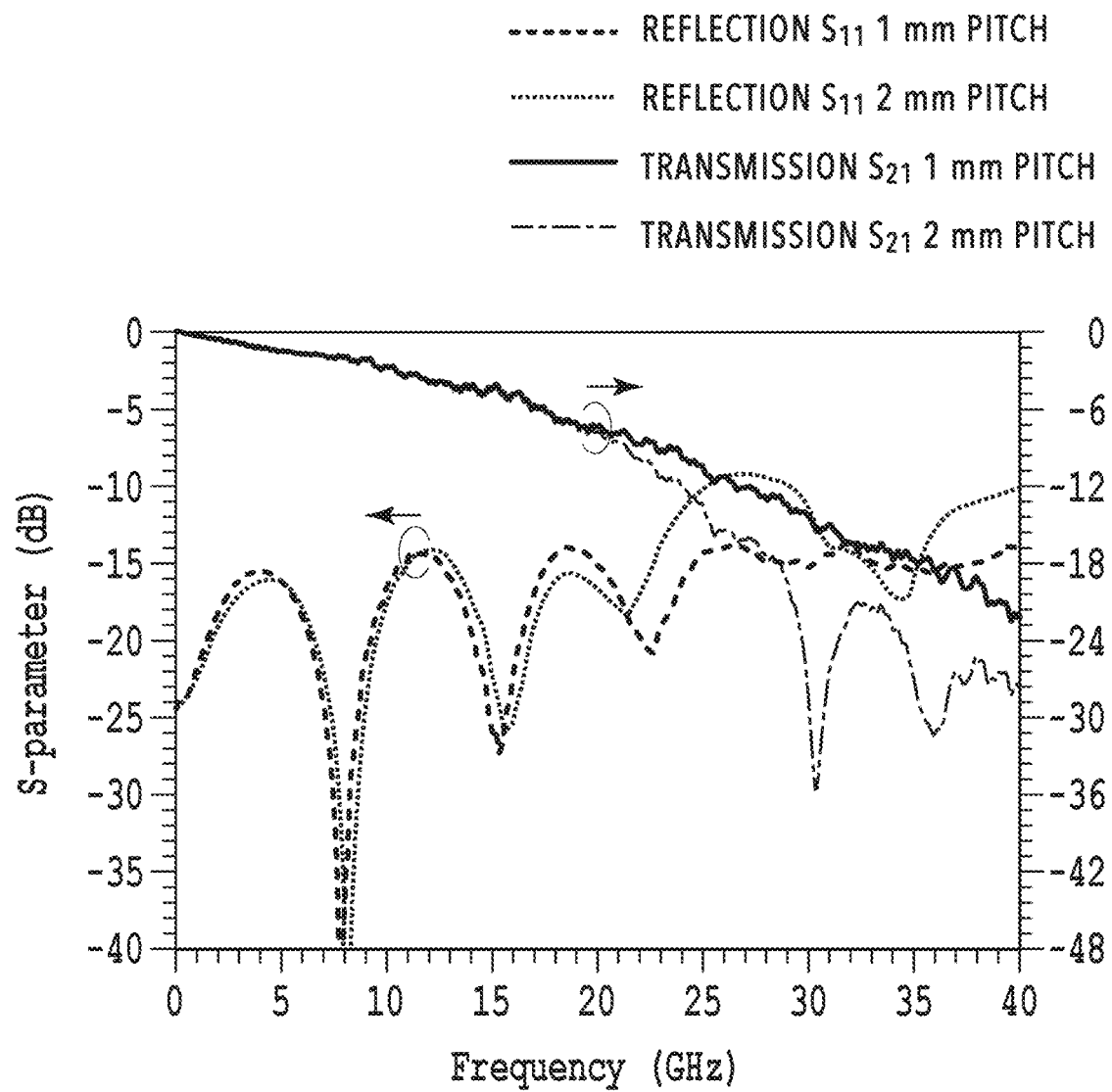
FIG. 10 is a diagram showing the results of measurement of S parameters of an electrical signal path in the Si optical modulator according to the first embodiment of the present invention.

FIG. 10 is a diagram showing the results of measurement of S parameters of an electrical signal path of an RF electrode in the bridge-connected dual electrode Si optical modulator according to the first embodiment of the present invention. The transmission characteristic ($S_{21}$) and the reflection characteristic ($S_{11}$) are shown with one end (e.g., left end) of the RF electrode 15a serving as an input and the other end serving as an output in the dual electrode Si optical modulator of FIG. 8. The length of the RF electrode in the y-axial direction of the optical modulator is 6 mm. Individual cases where the layout intervals of the interconnecting electrodes in the y-axial direction, as a parameter, are 1 mm and 2 mm are shown.

Figure 6A:
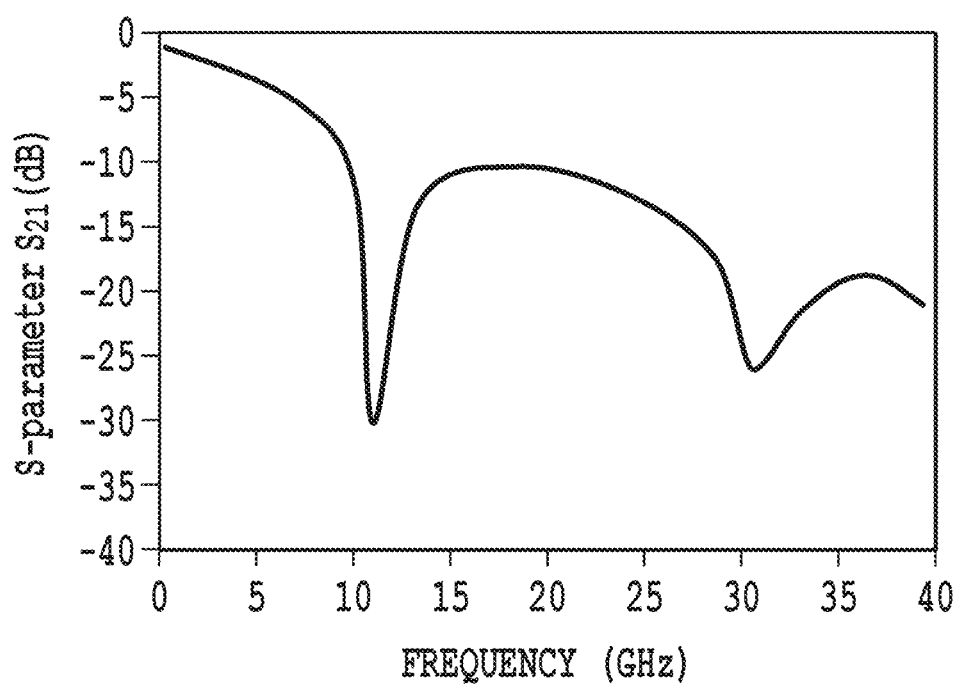
FIG. 6A is a diagram showing the results of measurement of an S parameter $S_{21}$ of an electrical signal path in the dual electrode Si optical modulator according to the related art.
Figure 6B:
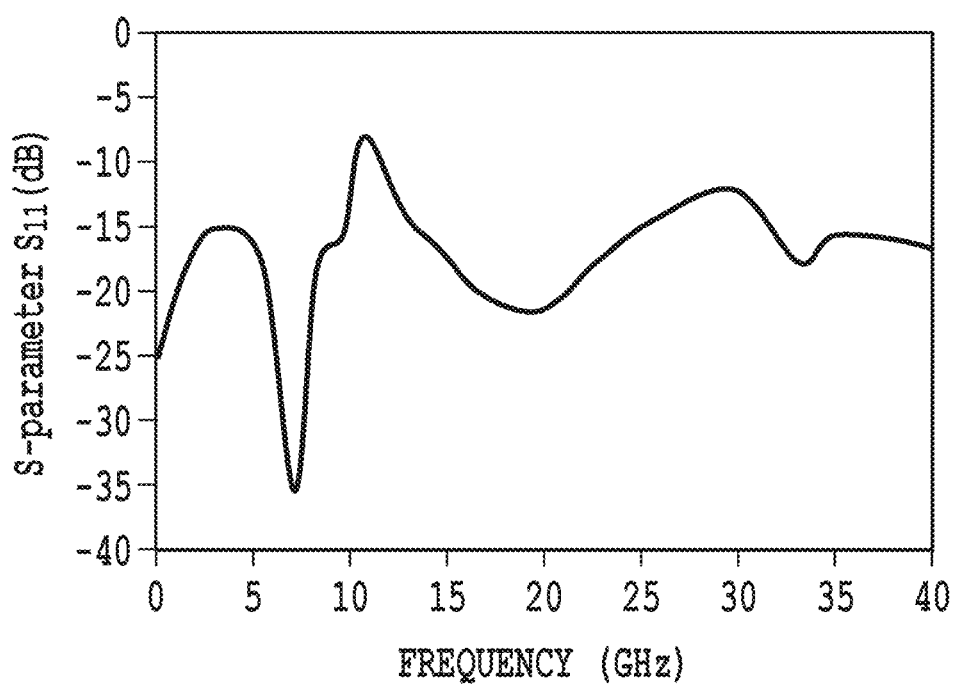
FIG. 6B is a diagram showing the results of measurement of an S parameter $S_{11}$ of the electrical signal path in the dual electrode Si optical modulator according to the related art.

For the interconnecting electrodes disposed at intervals of 2 mm in the optical modulator that is operated in a frequency band of up to 40 GHz or so, the rapid increase in transmission loss and large waving, observed according to the related art in FIG. 6A, have not been observed, and a significant degradation of the transmission characteristic $S_{21}$ has not been observed. With regard to the reflection characteristic, the reflection loss is mostly suppressed down to −10 dB or less over the full band of up to 40 GHz, and the reflection loss becomes −15 dB or less for the interconnecting electrodes disposed at narrower intervals of 1 mm. For the interconnecting electrodes disposed at intervals of 0.5 mm or less, the amount of improvement on the degradation of the frequency characteristic caused by the phase deviation of the return current has been saturated. Accordingly, the intervals of the interconnecting electrodes should be roughly set to a half or less of the wavelength for the maximum frequency of the modulation signal (RF signal).

It is found out that as shown in FIG. 10, the dual electrode Si optical modulator with two grounds bridge-wired by the interconnecting electrodes as in the present embodiment significantly improves the frequency band characteristics such as the transmission power and the return loss of the modulation signal in the RF electrode as compared with the related arts.

Second Embodiment

Figure 12:
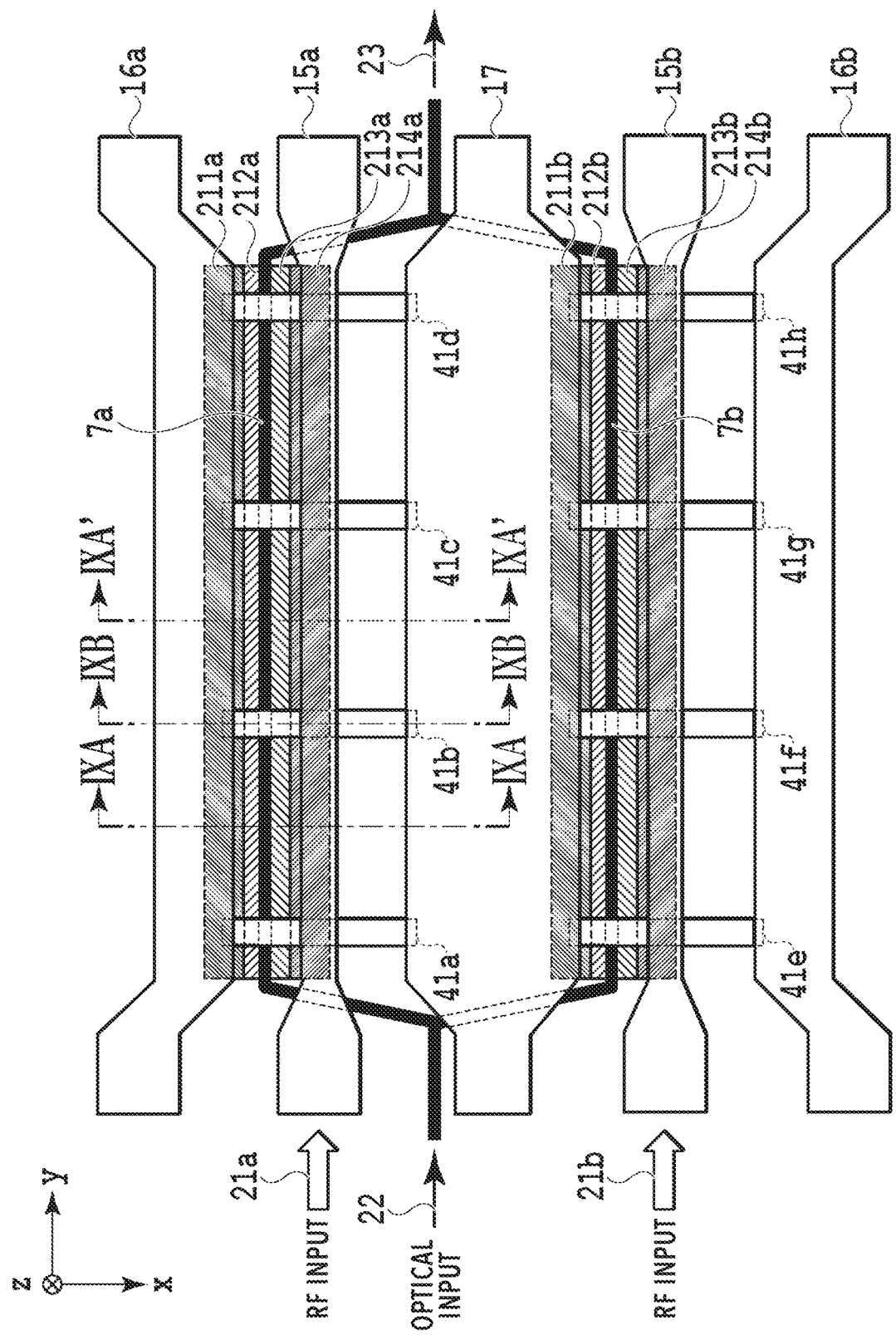
FIG. 12 is a diagram showing the configuration of a dual electrode Si optical modulator according to a second embodiment.

FIG. 12 is a diagram showing the configuration of a dual electrode Si optical modulator according to a second embodiment of the present invention. In the optical modulator of the second embodiment in FIG. 12, as in the first embodiment, two sets of radio-frequency electrodes formed by a CPW also have a configuration such that two ground electrodes 16a, 17 sandwiching an RF electrode 15a are connected at a plurality of locations by interconnecting electrodes 41a to 41d, and two ground electrodes 16b, 17 sandwiching an RF electrode 15b are connected at a plurality of locations by interconnecting electrodes 41e to 41h.

In the MZ optical modulator of the second embodiment, the corresponding optical waveguides 7a, 7b are arranged in such a way that they are positioned on the right side or the left side to the RF electrodes 15a, 15b along the x axis as viewed in the traveling direction (y-axial direction) of the radio-frequency electrical signal, and that the layout order of the plurality of semiconductor regions on the x axis are the same for both of the two RF electrodes 15a, 15b. That is, the arrangement is made so that the doping states such as the conductivity types, like p-type and n-type, and the polarities of semiconductors, are the same in both of the two optical waveguides. Therefore, the optical modulator according to the present embodiment may be implemented so that the rib waveguide includes a plurality of regions (211, 212, 213, 214) having different semiconductor polarities and conductivities in the widthwise direction (x direction) of the optical waveguide, when viewing the cross section (x-z plane) of the optical waveguide, and the layout of the plurality of regions in the rib waveguides is the same in both of the two sets of CPWs.

Specifically, the plurality of semiconductor regions of the core relating to the optical waveguide 7a in FIG. 12 are disposed in the order of, in the x-axial direction from top to bottom in FIG. 12, the heavily p-doped semiconductor layer 211a, the intermediate p-doped semiconductor layer 212a, the intermediate n-doped semiconductor layer 213a, and the heavily n-doped semiconductor layer 214a. In the present embodiment, the semiconductor regions of the core relating to the other optical waveguide 7b are likewise disposed in the order of, in the x-axial direction from top to bottom in FIG. 12, the heavily p-doped semiconductor layer 211b, the intermediate p-doped semiconductor layer 212b, the intermediate n-doped semiconductor layer 213b, and the heavily n-doped semiconductor layer 214b. The plurality of semiconductor regions are disposed on the x axis so that the location of the respective optical waveguide 7a, 7b coincides with the location of the boundary (pn junction) between the intermediate p-doped semiconductor layer 212 and the intermediate n-doped semiconductor layer 213. The layout is in contrast to the layout in the first embodiment, in which the semiconductor regions of each of the optical waveguides 7a, 7b are disposed symmetrical to those of the other optical waveguide to the y axis passing through the central ground electrode 17.

Therefore, the structures with a cross section along line IXA-IXA or a cross section along line IXA'-IXA' and a cross section along line IXB-IXB in FIG. 12 are similar to those of the first embodiment in FIGS. 9A and 9B. Furthermore, it should be noted that the layout order of the plurality of semiconductor regions in the x-axial direction is the same in the two optical waveguides 7a, 7b. As in the first embodiment, the interconnecting electrodes connecting the two ground electrodes equalize the potentials of the two ground electrodes. This eliminates the phase difference of the return currents (the phase difference of the charges propagating through the ground electrodes) which are induced on the respective ground electrodes by a radio-frequency electrical signal input to the RF electrode and propagate through the respective ground electrodes. Therefore, it is possible to fabricate a Si optical modulator that suppresses degradation of transmission/reflection characteristic of the input radio-frequency signal 22 in the RF electrodes 15a, 15b.

When the optical waveguides 7a, 7b are disposed in such a way that the positional relationship between the optical waveguides 7a, 7b as viewed in the traveling direction (y-axial direction) of the radio-frequency electrical signal as in the present embodiment, such as the optical waveguide being on the right side or the left side to the RF electrode 15a, 15b along the x axis, is also the same, and the layout order of the plurality of semiconductor regions on the x axis is the same in both of the two sets of CPWs and optical waveguides, there is an influence of the charge imbalance at the two ground electrodes. Depending on whether the optical waveguide is on the right side or on the left side, on the x axis, to the traveling direction (y-axial direction) of the radio-frequency electrical signal in the central ground electrode 17, the speed of the charges varies greatly even in the same ground electrode 17. Without a interconnecting electrode between two ground electrodes as in the optical modulator of the present invention, the above arrangement causes a significant degradation in the propagation characteristic of the radio-frequency signal.

Figure 1:
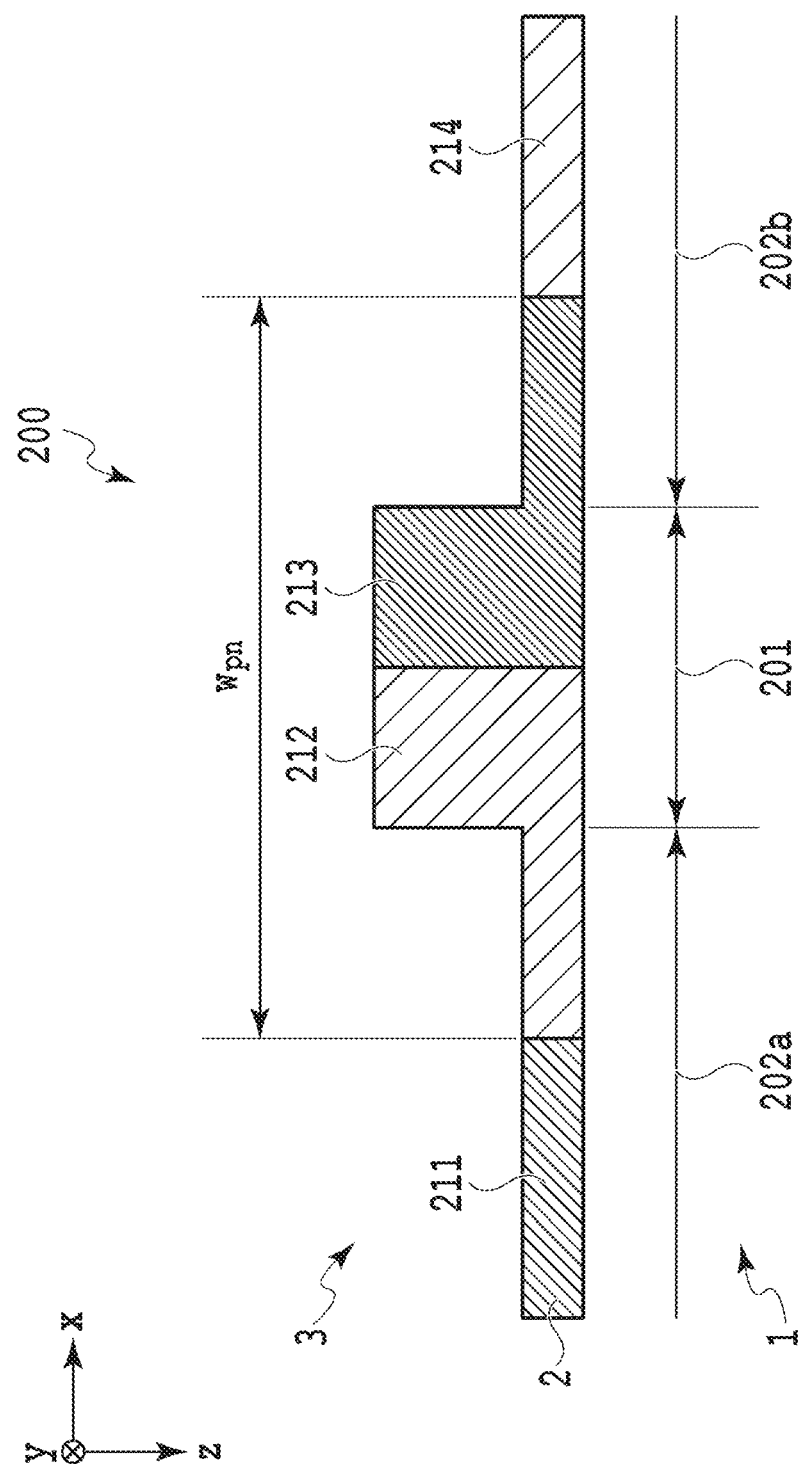
FIG. 1 is a view showing the sectional structure of an optical waveguide of a Si optical modulator according to a related art.
Figure 2:
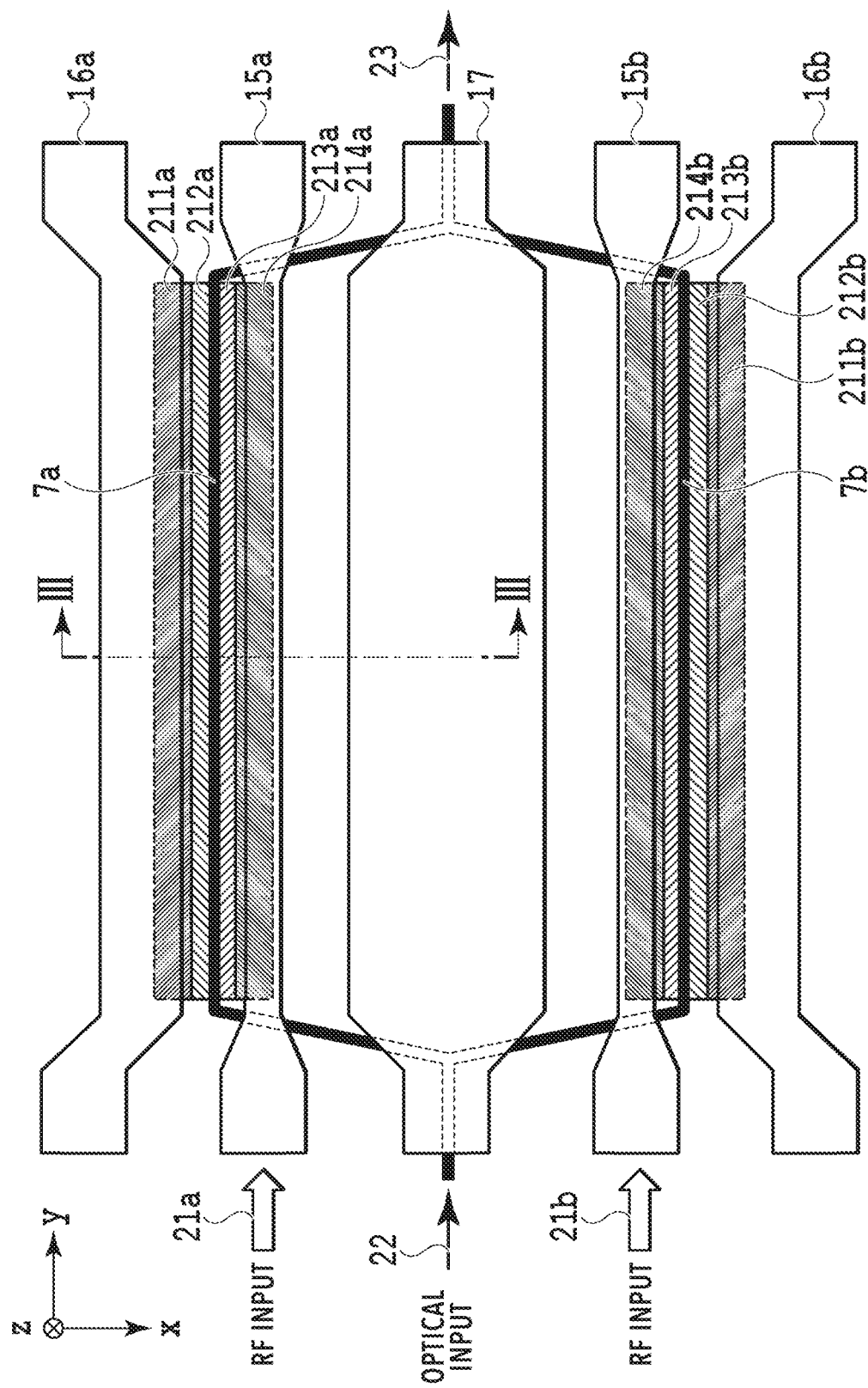
FIG. 2 is a top view showing a Si optical modulator having a dual electrode structure according to a related art.
Figure 3:
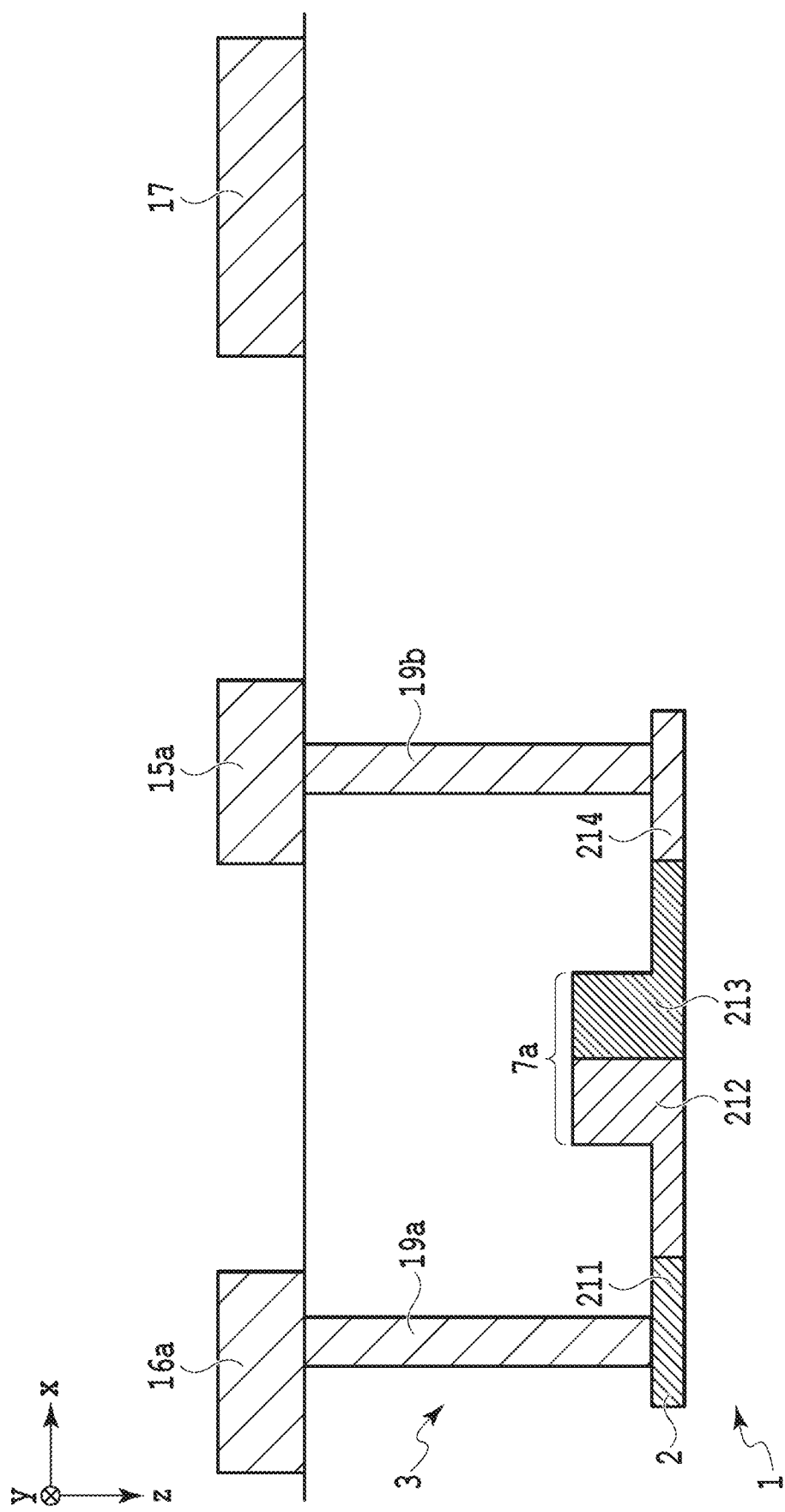
FIG. 3 is a view showing the cross section of the SI optical modulator according to the related art shown in FIG. 2.
Figure 4:
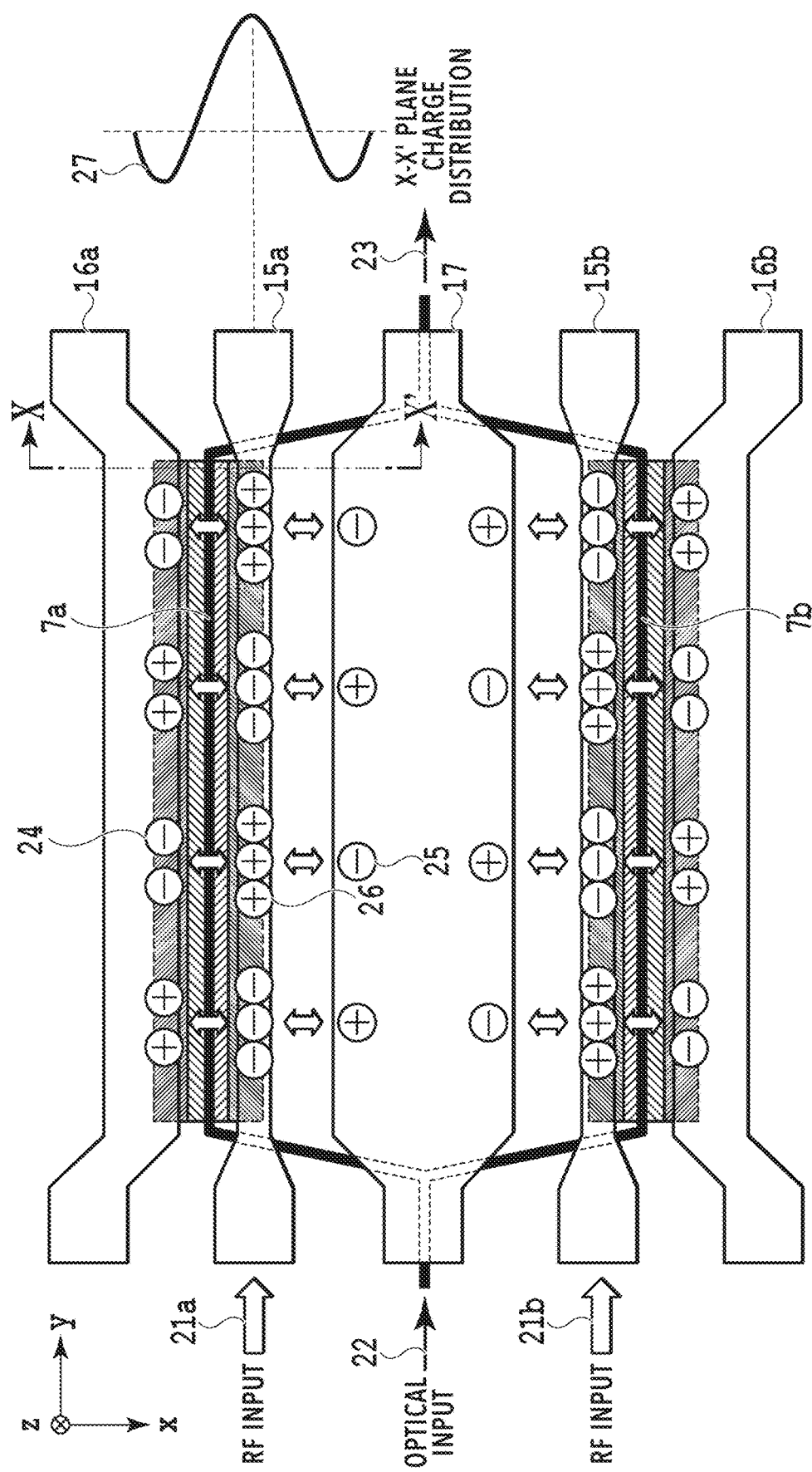
FIG. 4 is an explanatory diagram of the ideal propagation state of a modulation signal in a dual electrode Si optical modulator having a CPW structure.
Figure 5:
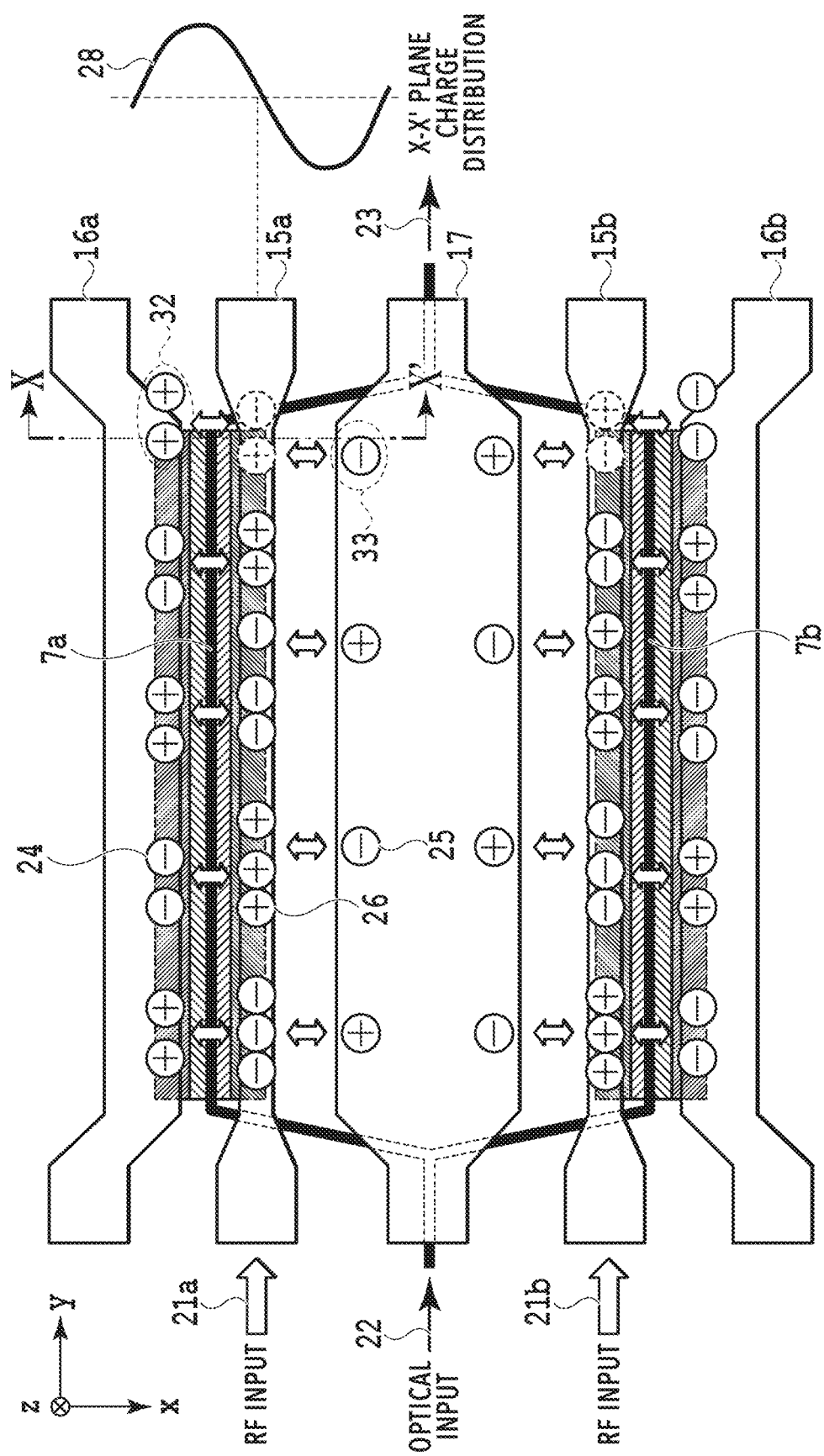
FIG. 5 is a diagram exemplarily showing the actual propagation state of a modulation signal in a dual electrode Si optical modulator having a CPW structure.

Furthermore, the configuration of the second embodiment can prevent degradation of the modulation characteristics originated from deviation (amount of an offset) of the location of the pn junction due to a mask offset at the time of implantation. In the Si optical modulator, if the positional deviation of the pn junction occurs due to the mask offset or the like in the implantation process for implanting a p-type or n-type impurity, the optical modulation characteristic deteriorates. In the optical modulator having the dual electrode configuration, when a positional deviation of the pn junction occurs due to the mask offset (for example, the up and down x-axial direction in FIG. 2 showing the conventional technique, and the left and right x-axial direction in the cross-sectional view of FIG. 3), a considerable error occurs in the structure of the pn junction between the two optical waveguides. In the case where the two optical waveguides constituting the Mach-Zehnder modulator are mirror-symmetric to the central ground electrode 17, the p-type layer becomes larger in one optical waveguide while the p-type layer in the other optical waveguide becomes smaller. In such a situation, a significant difference occurs in the modulation efficiency between the two optical waveguides, an optical signal which is modulated has a chirp such as a phase fluctuation, degrading the optical signal waveform.

A mask offset at the time of device fabrication in the CMSO compatible process has an accuracy of about ±30 nm even in the best conditions under the present circumstances, so that an ordinary mask deviation is not avoidable. An offset of several tens of nm is even difficult to measure, so that it is hardly possible to guarantee a fabrication accuracy of ±50 nm or less at the present time. However, according to the configuration of the optical modulator of the second embodiment of the present invention, the implant mask deviates in the same direction in the optical waveguide 7a and the optical waveguide 7b. Therefore, a difference in modulation efficiency between the two optical waveguides constituting the Mach-Zehnder optical modulator does not occur, ensuring implementation of an optical modulator with a good signal quality.

As described above, according to the configuration of the optical modulator of the second embodiment of the present invention, the relative positional relationship between one RF electrode and a corresponding optical waveguide, and the layout order of a plurality of semiconductor regions constituting the optical waveguide in the cross section (x-z plane) viewing the propagation direction (y-axial direction) of a radio-frequency signal are set to be identical between two sets of CPWs. This makes it possible to prevent the modulation characteristic from being degraded by the positional deviation of the pn junction originated from a mask offset at the time of implantation. Furthermore, since the two ground electrodes sandwiching the RF electrode are configured to be connected at a plurality of locations by the interconnecting electrodes in the radio-frequency electrode formed by the CPW structure, it is possible to prevent the transmission characteristic and reflection characteristic of the modulation signal from being degraded by the asymmetry of the CPW structure to achieve a wideband modulation characteristics. The interconnection to connect the two grounds can be prepared by using a CMOS compatible process, which eliminates the need for an Au plating or wiring lines.

The optical modulators of the present invention include those according to the following various aspects.

Preferably, the first signal electrode and the second signal electrode in the two sets of CPWs may be configured to be substantially in parallel to each other, and the interlayer interconnection may be a via.

According to another aspect of the present invention, the interlayer interconnection of the signal electrode may be a continuous via continuously formed in a wall shape in a lengthwise direction of the signal electrode, or a plurality of vias disposed in the lengthwise direction of the signal electrode, wherein the continuous via or the plurality of vias may be not formed, but a gap may be formed, in at least a part of the signal electrode so that the first ground electrode and the second ground electrode are connected to each other through the gap by the one or more interconnecting electrodes.

Preferably, the one or more interconnecting electrodes may be a bridge type electrode that linearly connects the first ground electrode and the second ground electrode. It is also preferable that the bridge type electrode should be disposed perpendicular to the first ground electrode and the second ground electrode.

More preferably, the one or more interconnecting electrodes may be configured to be separated from the rib waveguide by such a distance as not to degrade a radio frequency characteristic. It is further preferable that the one or more interconnecting electrodes should be separated from the rib waveguide by 0.6 μm or more.

It is also preferable that the one or more interconnecting electrodes should be a plurality of interconnecting electrodes with an interval therebetween being a half or less of a wavelength with respect to a maximum frequency of the RF signal.

According to another aspect (second embodiment) of the optical modulator of the present invention, the rib waveguide may comprise a plurality of regions different from one another in a type and a conductivity of a semiconductor in a widthwise direction of the optical waveguide when viewing the cross section of the optical waveguide, and layouts of the plurality of regions in the respective rib waveguides of the two sets of CPWs may be identical to each other.

In either case of the first embodiment or the second embodiment described above, it is possible to suppress the influence of charge imbalance originated from the asymmetry of the CPW structure and prevent degradation of the transmission characteristic and reflection characteristic of a modulation signal, thereby achieving wideband modulation characteristics. Unlike the optical modulators according to the related arts, therefore, the optical modulator of the present invention need not shorten the electrode length. Although increasing the length of the RF modulation electrode is undesirable from the viewpoint of increasing the chip size, enablement to increase the length of the RF modulation electrode brings about an effect of lowering the modulation voltage, which leads to the following new advantages.

First, the power consumption of the signal generator can be reduced.

Secondly, since a sufficient modulation voltage may be provided, the ON/OFF ratio of light can be set large when light is intensity-modulated.

Thirdly, since a sufficient modulation voltage may be provided, loss of light can be suppressed small when light is phase-modulated.

Therefore, the effect of the optical modulator of the present invention to enable lengthening of the RF modulation electrode brings about a more effect to the overall optical modulator than is affected by the shortcoming such that the chip size increases. Since the interconnecting electrodes in the present invention may be prepared by using a CMOS compatible process directly, it is possible to provide a wideband optical modulator at a low cost, which eliminates the phase difference of the return currents propagating through the two ground electrodes while making full use of various merits of the low-cost and downsizable Si optical modulator, and suppresses degradation of the frequency response characteristic. It is possible to provide an excellent optical modulator which solves the problems of the related arts.

INDUSTRIAL APPLICABILITY

The present invention may be generally used in an optical communication system. More particularly, the present invention relates to an optical modulator in an optical transmitter in an optical communication system.

The invention claimed is:

1. A Si optical modulator having at least two sets of coplanar waveguides (CPWs) formed on a substrate, each CPW including a signal electrode to which a radio-frequency (RF) signal is applied, wherein
each CPW includes:
the signal electrode;
a first ground electrode disposed on one side of the signal electrode with an optical waveguide formed inside the substrate in between; and
a second ground electrode disposed on an other side of the signal electrode, and
wherein
the optical waveguide comprises a rib waveguide having a center core and slab regions on respective sides thereof,
the first ground electrode is connected to one of the slab regions by an interlayer interconnection,
the signal electrode is connected to the other one of the slab regions by an interlayer interconnection, and
the first ground electrode and the second ground electrode are connected to each other by one or more interconnecting electrodes passing between the signal electrode and the optical waveguides in a thicknesswise direction of the substrate.

2. The optical modulator according to claim 1, wherein
the first signal electrode and the second signal electrode in the two sets of CPWs are configured to be substantially in parallel to each other, and
the interlayer interconnection is a via.

3. The optical modulator according to claim 1, wherein
the first signal electrode and the second signal electrode in the two sets of CPWs are configured to be substantially in parallel to each other, and
the interlayer interconnection of the signal electrode is:
a continuous via continuously formed in a wall shape in a lengthwise direction of the signal electrode, or
a plurality of vias disposed in the lengthwise direction of the signal electrode,
wherein
the continuous via or the plurality of vias are not formed, but a gap is formed, in at least a part of the signal electrode so that the first ground electrode and the second ground electrode are connected to each other through the gap by the one or more interconnecting electrodes.

4. The optical modulator according to claim 1, wherein
the one or more interconnecting electrodes are a bridge type electrode that linearly connects the first signal electrode and the second signal electrode.

5. The optical modulator according to claim 4, wherein
the bridge type electrode is disposed perpendicular to the first ground electrode and the second ground electrode.

6. The optical modulator according to claim 1, wherein the one or more interconnecting electrodes are configured to be separated from the rib waveguide by such a distance as not to degrade a radio frequency characteristic.

7. The optical modulator according to claim 1, wherein the one or more interconnecting electrodes are separated from the rib waveguide by 0.6 µm or more.

8. The optical modulator according to claim 1, wherein the one or more interconnecting electrodes are a plurality of interconnecting electrodes with an interval therebetween being a half or less of a wavelength with respect to a maximum frequency of the RF signal.

9. The optical modulator according to claim 1, wherein the rib waveguide comprises a plurality of regions different from one another in a type and a conductivity of a semiconductor in a widthwise direction of the optical waveguide when viewing a cross section of the optical waveguide, and layouts of the plurality of regions in the respective rib waveguides of the two sets of CPWs are identical to each other.

* * * * *